US010086728B2

(12) United States Patent
White et al.

(10) Patent No.: US 10,086,728 B2
(45) Date of Patent: Oct. 2, 2018

(54) ADJUSTABLE SEAT

(71) Applicant: Johnson Controls Technology Company, Holland, MI (US)

(72) Inventors: Brennon White, Novi, MI (US); Mason Pike, Howell, MI (US); Ken Clark, Howell, MI (US); Nathan Caruss, Ann Arbor, MI (US); E J Zadina, Canton, MI (US); Jeff Laho, Canton, MI (US); James Hollowood, Saline, MI (US); Nicholas Petouhoff, South Lyon, MI (US); Patricia White, Novi, MI (US); Dan Ridgeway, Dearborn, MI (US); Eric Michalak, Canton, MI (US); Alex Saveski, South Lyon, MI (US); Jennifer Carlson, Ypsilanti, MI (US); Brad Feiler, Novi, MI (US); Mark Milner, White Lake, MI (US); Dalibor Dimovski, Macomb, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 173 days.

(21) Appl. No.: 15/036,560

(22) PCT Filed: Nov. 18, 2014

(86) PCT No.: PCT/US2014/066160
§ 371 (c)(1),
(2) Date: May 13, 2016

(87) PCT Pub. No.: WO2015/077231
PCT Pub. Date: May 28, 2015

(65) Prior Publication Data
US 2016/0297337 A1 Oct. 13, 2016

Related U.S. Application Data

(60) Provisional application No. 61/906,376, filed on Nov. 19, 2013.

(51) Int. Cl.
*B60N 2/02* (2006.01)
*B60N 2/66* (2006.01)
(Continued)

(52) U.S. Cl.
CPC ........... *B60N 2/667* (2015.04); *B60N 2/0244* (2013.01); *B60N 2/0276* (2013.01);
(Continued)

(58) Field of Classification Search
None
See application file for complete search history.

(56) References Cited

U.S. PATENT DOCUMENTS 2,558,171 A * 6/1951 Chesley ................. A47C 1/032
297/284.4
3,762,769 A * 10/1973 Poschl ................... A47C 7/462
297/284.4
(Continued)

FOREIGN PATENT DOCUMENTS

CN 1498793 A 5/2004
DE 10 2009 033 883 A1 1/2011
(Continued)

OTHER PUBLICATIONS

Office Action dated Aug. 8, 2017, in corresponding Japanese application No. 2016-532076, 7 pages.
(Continued)

Primary Examiner — Timothy J Brindley
Assistant Examiner — Kyle Walraed-Sullivan
(74) Attorney, Agent, or Firm — Foley & Lardner LLP

(57) ABSTRACT

An adjustable vehicle seat configured to support an occupant in a vehicle may include a seat cushion portion, a seat back
(Continued)

portion including a backrest movable relative to the seat cushion portion, and a contour linkage linked to the seat cushion portion and the backrest. The contour linkage may be configured to impose force on the backrest upon movement of the seat cushion portion relative to the backrest in at least one of a fore/aft, vertical, and rotational direction. The backrest may be configured such that a backrest contour is altered based on force imposed by the contour linkage in response to movement of the seat cushion portion relative to the backrest. The backrest contour may include at least one of a contour angle of an occupant-side surface of the backrest, a maximum offset of the occupant-side surface, and vertical height of a contour apex.

15 Claims, 21 Drawing Sheets

(51) Int. Cl.
  *B60N 2/22* (2006.01)
  *B60N 2/90* (2018.01)
(52) U.S. Cl.
  CPC ......... *B60N 2/2209* (2013.01); *B60N 2/2222* (2013.01); *B60N 2/666* (2015.04); *B60N 2/99* (2018.02); *B60N 2002/0268* (2013.01); *B60N 2002/948* (2018.02)

(56) References Cited

U.S. PATENT DOCUMENTS

| | | | | | |
|---|---|---|---|---|---|
| 5,125,598 | A * | 6/1992 | Fox | ................ | B60N 2/4242 244/122 R |
| 5,174,526 | A * | 12/1992 | Kanigowski | ......... | B60N 2/6671 244/118.5 |
| 5,567,011 | A * | 10/1996 | Sessini | ................ | B60N 2/0232 297/284.4 |
| 5,707,109 | A * | 1/1998 | Massara | ............... | B60N 2/4415 297/284.9 |
| 5,758,859 | A * | 6/1998 | Gonzalez | ............. | B60N 2/4235 248/420 |
| 5,975,633 | A | 11/1999 | Walk et al. | | |
| 6,199,951 | B1 * | 3/2001 | Zeile | .................... | B60N 2/3011 297/15 |
| 6,322,140 | B1 * | 11/2001 | Jessup | .................. | B60N 2/4221 296/68.1 |
| 6,554,360 | B1 | 4/2003 | Wilke et al. | | |
| 6,802,563 | B1 * | 10/2004 | Mysliwiec | ........... | B60N 2/4492 297/284.9 |
| 7,484,799 | B2 * | 2/2009 | Meyer | ................. | B60N 2/0715 248/622 |
| 7,874,618 | B2 * | 1/2011 | Kohl | ..................... | B60N 2/2209 297/284.4 |
| 8,973,994 | B2 * | 3/2015 | Muck | .................. | B60N 2/0232 297/284.7 |
| 9,527,413 | B1 * | 12/2016 | Thyagarajan | ...... | B60N 2/42736 |
| 2004/0097837 | A1 * | 5/2004 | Brandon | ................ | A61B 5/103 600/587 |
| 2005/0264069 | A1 | 12/2005 | Makhsous et al. | | |
| 2006/0061169 | A1 | 3/2006 | Kohl et al. | | |
| 2006/0244293 | A1 * | 11/2006 | Buffa | .................. | B60N 2/6671 297/284.4 |
| 2007/0063562 | A1 * | 3/2007 | Michalak | ............. | B60N 2/0232 297/284.9 |
| 2007/0080570 | A1 | 4/2007 | Kohl et al. | | |
| 2007/0152483 | A1 * | 7/2007 | Fujita | ...................... | A47C 7/28 297/284.1 |
| 2008/0009989 | A1 * | 1/2008 | Kim | .................... | B60N 2/0232 701/36 |
| 2008/0191533 | A1 * | 8/2008 | Poniatowski | ........ | B60N 2/3011 297/284.9 |
| 2009/0045659 | A1 * | 2/2009 | List | ...................... | B60N 2/4242 297/216.15 |
| 2009/0218858 | A1 * | 9/2009 | Lawall | ................. | B60N 2/4235 297/216.1 |
| 2009/0243347 | A1 * | 10/2009 | Wilms | ................... | B60N 2/002 297/61 |
| 2010/0164266 | A1 * | 7/2010 | Walters | .................. | A47C 1/023 297/337 |
| 2010/0244526 | A1 * | 9/2010 | Kajimoto | ............. | B60N 2/4808 297/354.1 |
| 2011/0035118 | A1 * | 2/2011 | Hiemenz | .............. | B60N 2/4242 701/45 |
| 2011/0233979 | A1 * | 9/2011 | An | ........................... | A47C 7/46 297/284.4 |
| 2011/0285186 | A1 | 11/2011 | Demmelmeier et al. | | |
| 2012/0007399 | A1 * | 1/2012 | Jaranson | .................. | B60N 2/66 297/284.4 |
| 2012/0025580 | A1 * | 2/2012 | Masuda | ................... | B60N 2/66 297/354.12 |
| 2012/0048999 | A1 * | 3/2012 | Schurg | ................. | B60N 2/2222 244/118.6 |
| 2012/0086249 | A1 * | 4/2012 | Hotary | ................. | B60N 2/0228 297/284.3 |
| 2012/0119551 | A1 * | 5/2012 | Brncick | ................. | B60N 2/643 297/284.2 |
| 2013/0285426 | A1 | 10/2013 | Arant et al. | | |
| 2014/0062153 | A1 * | 3/2014 | Grove | .................. | A47C 3/0252 297/284.4 |
| 2014/0191550 | A1 * | 7/2014 | Katoh | ....................... | B60N 2/48 297/337 |
| 2014/0346829 | A1 * | 11/2014 | Singla Casasayas | .. | A47C 1/023 297/337 |
| 2014/0361590 | A1 * | 12/2014 | Line | ....................... | B60N 2/449 297/284.9 |
| 2015/0130237 | A1 * | 5/2015 | Takeuchi | .................. | B60N 2/70 297/301.1 |
| 2015/0367756 | A1 * | 12/2015 | Katoh | .................... | B60N 2/666 297/285 |

FOREIGN PATENT DOCUMENTS

| | | |
|---|---|---|
| DE | 20 2011 001 375 U1 | 3/2011 |
| DE | 20 2011 001 375 U1 | 4/2011 |
| DE | 10 2010 039 409 A1 | 2/2012 |
| EP | 1 738 955 A2 | 1/2007 |
| JP | H672198 A | 3/1994 |
| JP | 2008-253609 A | 10/2008 |
| JP | 2009-046026 A | 3/2009 |
| KR | 10-2005-0038681 | 4/2005 |
| KR | 10-2008-0038292 | 5/2008 |

OTHER PUBLICATIONS

International Search Report in PCT/US2014/066160 dated Feb. 5, 2015, 5 pages.
Written Opinion of the International Searching Authority in PCT/US2014/066160 dated Feb. 5, 2015, 5 pages.
Office Action dated Jun. 15, 2017, received in corresponding Korean application No. 10-2016-7016077, 9 pages.
International Preliminary Report on Patentability and Transmittal received in International Application No. PCT/US2014/066160 dated Jun. 2, 2016, 7 pages.
Office Action dated May 4, 2017, received in corresponding Chinese application No. 201480072935.9, 7 pages.
Notice of Allowance dated Jun. 11, 2018, in corresponding Korean application No. 10-2016-7016077 (3 pages) and English translation (1 page).

* cited by examiner

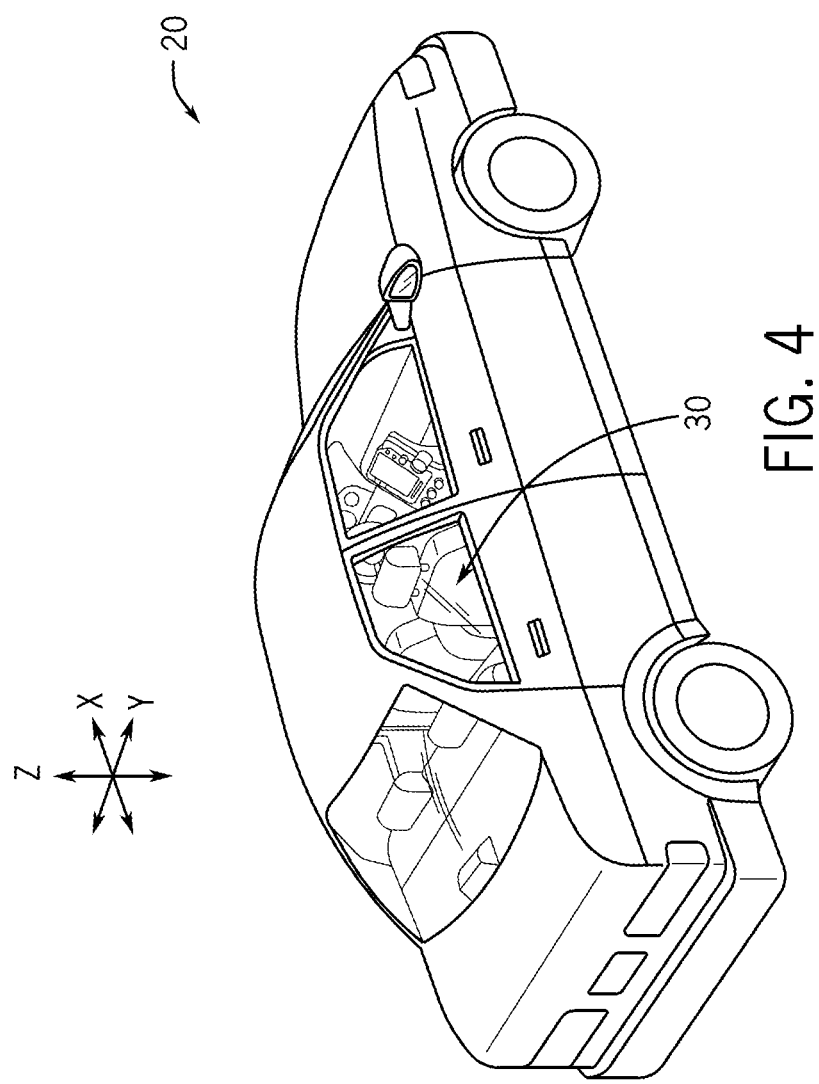

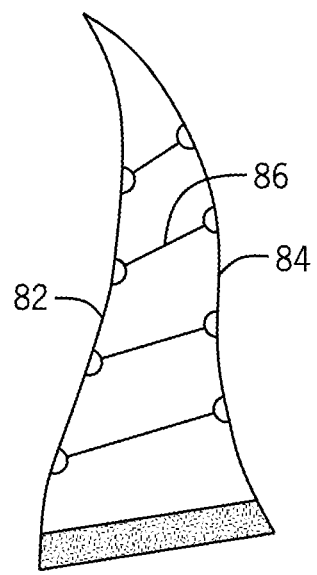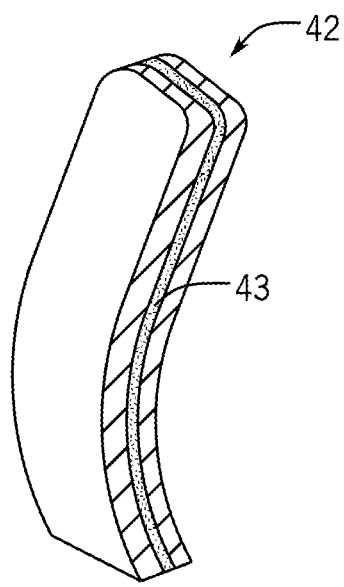
FIG. 19        FIG. 20
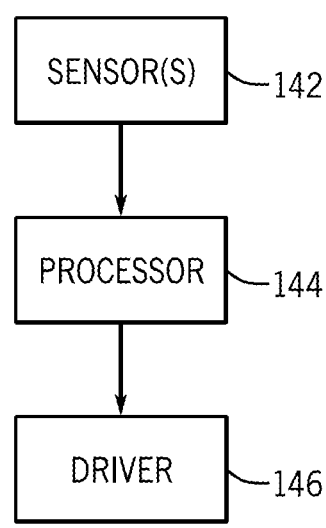
FIG. 21

US 10,086,728 B2

ADJUSTABLE SEAT

CROSS-REFERENCE TO RELATED PATENT APPLICATIONS

The present application is a U.S. National Stage of International Application No. PCT/US2014/066160 filed on Nov. 18, 2014, which claims the benefit of U.S. Provisional Patent Application No. 61/906,376 filed on Nov. 19, 2013, the entire disclosures of all of which are incorporated herein by reference.

FIELD

The invention relates generally to adjustable vehicle seats.

BACKGROUND

Various portions of the body (such as the thighs, pelvis, and lower spine) are directly correlated and have a kinematic relationship as they move. Therefore, as the occupant transitions between postures in a seated position, the load distribution (between the back and the pelvis) and the required support (e.g., the amount of contour) changes. Additionally, different body types require different types and amounts of support.

Typically, seats (both within vehicles and separate from vehicles) do not adjust according to the unique body structure and current posture of the occupant and therefore do not provide the proper contours and support. The position and amount of provided support of the seat components (such as the seat back and cushion) adjust independently without regard to the occupant's body or required support according to the occupant's posture (e.g., slouched or upright). For example, most seats direct 60% of the load to the cushion and 40% of the load to the seat back. As the load distribution changes with the occupant's posture, the position and contours of the seat components do not adjust accordingly.

SUMMARY

According to one embodiment, an adjustable vehicle seat configured to support an occupant in a vehicle may include a seat cushion portion, a seat back portion including a backrest movable relative to the seat cushion portion, and a contour linkage linked to the seat cushion portion and the backrest. The contour linkage may be configured to impose force on the backrest upon movement of the seat cushion portion relative to the backrest in at least one of a fore/aft direction, a vertical direction, and a rotational direction. The backrest may be configured such that a backrest contour is altered based on force imposed by the contour linkage in response to movement of the seat cushion portion relative to the backrest. The backrest contour that is altered may include at least one of a contour angle of an occupant-side surface of the backrest relative to a vertical axis, a maximum offset of the occupant-side surface relative to a standard position of the occupant-side surface, and vertical height of a contour apex of the occupant-side surface.

According to another embodiment, a method of adjusting a vehicle seat configured to support an occupant in a vehicle may include moving a seat cushion portion relative to a backrest of a seat back portion in at least one of a fore/aft direction, a vertical direction, and a rotational direction, imposing a force on the backrest in response to movement of the seat cushion portion, and altering a backrest contour of the backrest based on the force imposed on the backrest. The backrest contour that is altered may include at least one of a contour angle of an occupant-side surface of the backrest relative to a vertical axis, a maximum offset of the occupant-side surface relative to a standard position of the occupant-side surface, and vertical height of a contour apex of the occupant-side surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features, aspects, and advantages of the present invention will become apparent from the following description, appended claims, and the accompanying exemplary embodiments shown in the drawings, which are briefly described below.

FIG. 4 is a perspective view of a vehicle according to one embodiment.

FIG. 19 is a cross-sectional, side view of an embodiment of a seat back that may be disposed within a vehicle seat.

FIG. 20 is a cross-sectional, perspective view of an embodiment of a backrest that may be disposed within a vehicle seat.

FIG. 21 is a schematic representation of an adjusting mechanism of an adjustable seat according to one embodiment.

DETAILED DESCRIPTION

Referring generally to the figures, disclosed herein is an adjustable seat, as shown according to exemplary embodiments, that preferably can be configured to provide human-centric positional adjustments and may be adjusted to ergonomically and custom fit an occupant's body and anthropometric movement and variation. The adjustable seat and methods described herein may be used in a variety of applications requiring a seat (including vehicular and non-vehicular applications), wherein it would be desirable to provide an optimized seat structure that may be ergonomically adjusted according to the occupant's body, desired positioning, and current posture. In one exemplary embodiment, the adjustable seat is used within a vehicle to provide optimal positioning for the occupant according to body type, comfort, posture, and relative positioning with respect to the vehicle. For example, the adjustable seat links the movement, orientation, and contours of the seat back to the seat cushion position to allow for natural thigh and lumbopelvic movements of the current occupant.

Overview of the Human Spine and Pelvis.

Figure 1:
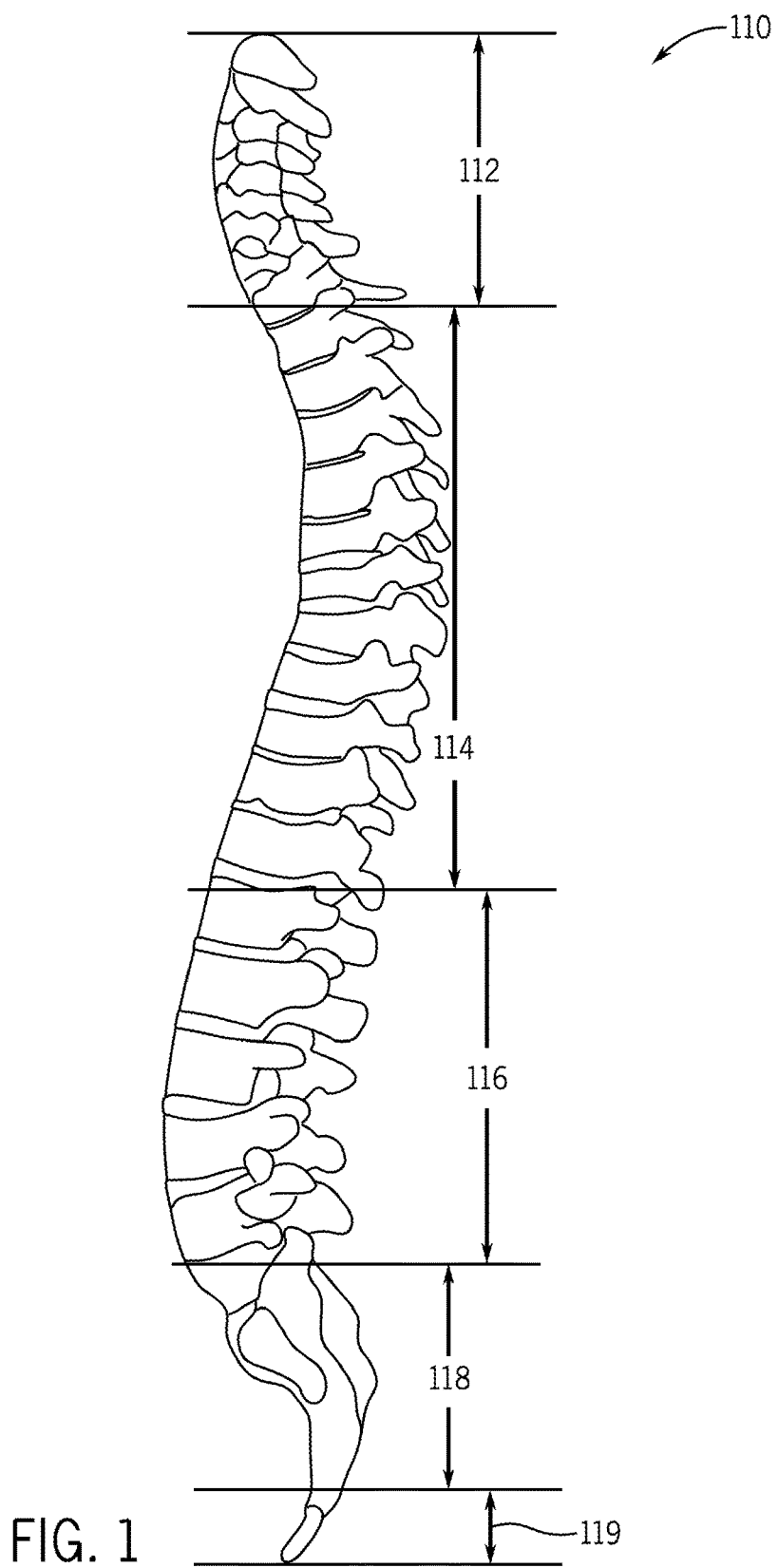
FIG. 1 is a perspective side view of a human spine.

As shown in FIG. 1, the spine 110 of the human body is categorized into five regions of vertebrae. The cervical vertebrae 112 (including vertebrae C1-C7) generally comprises the neck region of the spine and is connected to the base of the skull. The thoracic vertebrae 114 (including vertebrae T1-T12) generally comprises the upper back region of the spine. The lumbar vertebrae 116 (including vertebrae L1-L5) generally comprises the lower back region of the spine. The sacrum 118 and coccyx 119 generally comprise the lowermost portion of the spine and the tailbone and include fused vertebrae.

The side or lateral profile of the human spine 110 includes several curves along the length of the back, generally corresponding with the five regions. The two most prominent regions of curvature are with the thoracic vertebrae 114 and the lumbar vertebrae 116. The thoracic vertebrae 114 generally follow a kyphotic shape (a curvature that is anteriorly concave). The lumbar vertebrae 116 generally follow a lordodic shape (a curvature that is posteriorly concave). These two curves generally create an "S" curve along the spine.

The lower portion of the spine 110 connects to the pelvis 120. The top of the pelvis 120 includes the iliac crest 124 and the bottom of the pelvis 120 includes the ischial tuberosity 122, as shown in FIGS. 2A-3B, which is the most prominent point of the base of the pelvis 120. While in the seated position, most of the occupant load or pressure is directed to the cushion from the ischial tuberosity 122. As discussed later, amount of occupant load directed through the ischial tuberosity 122 may be at least partially transitioned to occupant loading through the back to the seat back, depending on the current posture of the occupant.

The pelvis 120 rotatably connects the spine 110 to the head (top) of the femurs 130, as shown in FIGS. 2A-3B. The femurs 130 correspond to the thigh region of the human body.

The muscles, tendons, and skeleton of the human body are linked throughout the body and have a direct kinematic relationship between their movements and orientations. In particular, the muscles, tendons, and skeleton correlate the positioning of the spine 110, pelvis 120, and femurs 130 with each other and the overall position of the body. As the spine 110, pelvis 120, or femurs 130 moves or rotates, the others will move accordingly or strain will result. Therefore, as the body (the spine or other regions of the body) moves, these regions of curvature may be accentuated or minimized.

Figure 2A:
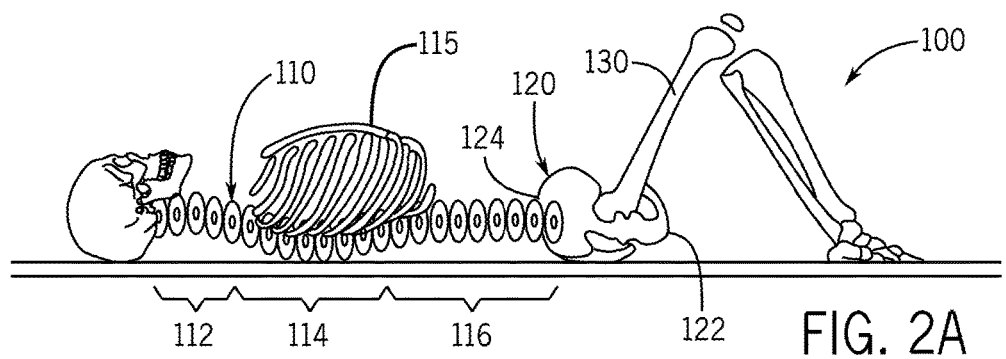
FIGS. 2A-2C are side views of a partial human skeleton in different positions.

For example, the natural curvature of lumbar vertebrae 116 of the spine 110 in a standing position is lordodic (similar to the neutral spine shown in FIG. 1 and with the partial skeleton 100 in FIG. 2A). As the body moves to a seated position, the curve transitions to a more kyphotic shape. More specifically, as the body moves from a standing position to a seated position, the thigh-to-torso angle is reduced, causing the ligaments and muscles connecting the pelvis 120 and lumbar vertebrae 116 to strain. This causes the iliac crest 124 to rotate in a posterior direction, reducing the lordodic shape of the lower back (or lumbar vertebrae 116).

Figure 2B:
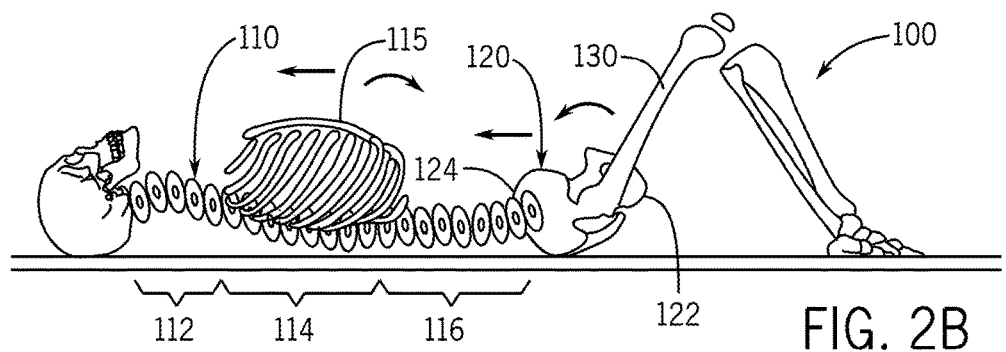

Similar kinematic relationships may be seen within the seated position of a body as the spine 110 transitions between an upright posture to a slouched posture (as shown in FIG. 2B). Moving the ischial tuberosity 122 of the pelvis 120 forward (in an anterior direction, moving from an "upright" posture to a "slouching" posture) will additionally increase the posterior pelvic rotation of the iliac crest 124 and further increase the strain on lumbar vertebrae 116, causing the lordodic curvature to continue to decrease and the lower back to transition to and assume a kyphotic shape.

As the body transitions from the upright posture to the slouched posture in a seated position, the occupant load will transition from the ischial tuberosity 122 (loaded onto the cushion) to the back of the occupant (loaded onto the seat back), thus changing the required support to be provided by a seat. Without the proper contours and support within the seat, the strain will continue to increase.

The kinematic relationship between the angle of the pelvis and the curvature of the spine is shown with the skeleton 100 in FIGS. 2A-C and FIGS. 3A-B. FIG. 2A, like FIG. 1, depicts the spine 110 and the pelvis 120 in a "neutral" position. The thoracic vertebrae 114 generally follow the kyphotic shape and the lumbar vertebrae 116 generally follow a lordodic shape.

Figure 3A:
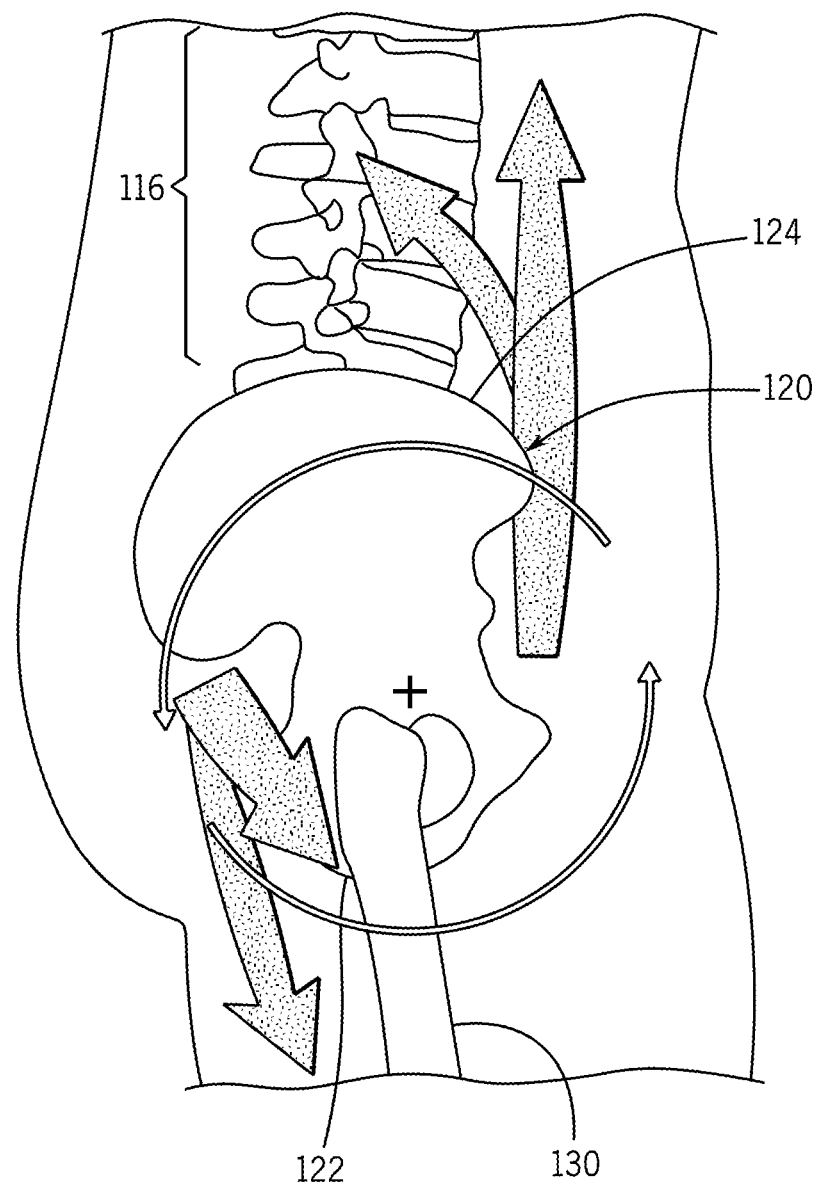
FIGS. 3A-3B are cross-sectional, side views of the human spine, pelvis, and femur in different positions.

FIGS. 2B and 3A depict the pelvis 120 rotating or tilting upward, such that the ischial tuberosity 122 moves in an anterior direction and the iliac crest 124 tilts in a posterior direction, mimicking a slouching posture. Accordingly, the lumbar vertebrae 116 transition from the lordodic shape (in FIG. 2A) to a kyphotic shape, the bottom of the thoracic cage 115 (the rib cage) rotates posteriorly, and the lordodic curvature of the cervical vertebrae 112 becomes more pronounced.

Figure 2C:
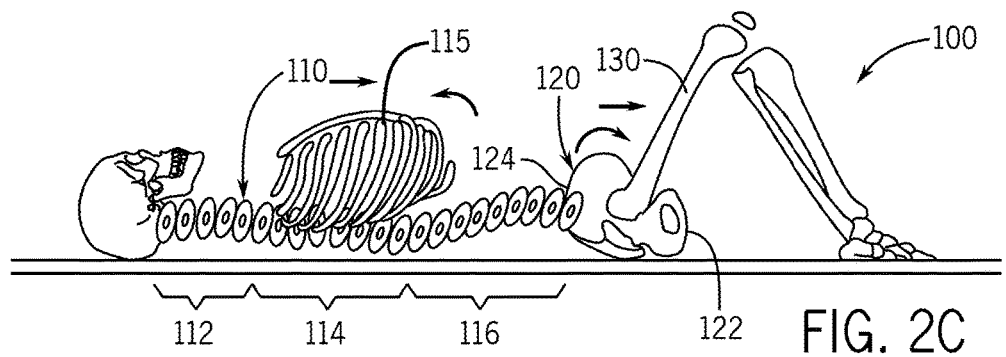
Figure 3B:
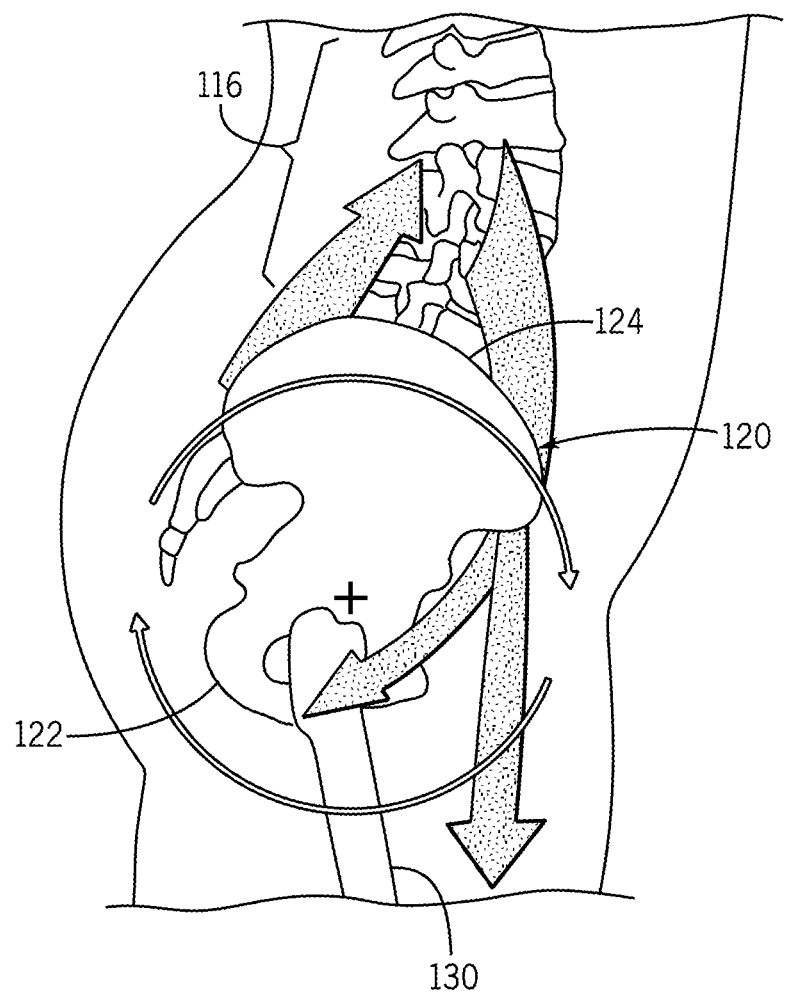

Conversely, FIGS. 2C and 3B depict the pelvis 120 rotating or tilting downward into a more upright position, such that the ischial tuberosity 122 moves in a posterior direction and the iliac crest 124 tilts in an anterior direction. Accordingly, the lordodic shape of the lumbar vertebrae 116 is exaggerated, the bottom of the thoracic cage 115 rotates anteriorly, and the lordodic curvature of the cervical vertebrae 112 is reduced. Moving from a slouched position to an upright position transitions the occupant load from the back of the occupant (loaded onto the seat back) to the ischial tuberosity 122 (loaded onto the cushion).

As such, as the body transitions between different postures, particularly in a seated position, multiple different areas of the body are affected, resulting in changes in bodily strains and changing the type and amount of support required. The seat, therefore, must accommodate and adjust to both the specific body of the occupant and to the changes in weight distribution and curvatures of the seated body.

Overview of the Adjustable Seat.

FIG. 4 illustrates an exemplary embodiment of a vehicle 20 that may include an adjustable seat 30 to ergonomically provide custom and adjustable support an occupant. The vehicle 20 may include an interior passenger compartment containing a vehicle seat for providing seating to an occupant. The vehicle seat may be the adjustable seat 30. Although a four door sedan automobile is shown in FIG. 4, the adjustable seat 30 may be used in a variety of applications, but is particularly useful within any type of vehicle, such as a two door or four door automobile, a truck, a SUV, a van, a train, a boat, an airplane, or other suitable vehicular conveyance. Even more preferably, multiple adjustable seats 30 may be disposed at various locations within the vehicle 20. Although the adjustable seat 30 is shown within the vehicle 20, the adjustable seat 30 may be used within a variety of settings, including as a stand-alone chair or seat. For example, the adjustable seat 30 may be used within offices or homes.

Figure 5:
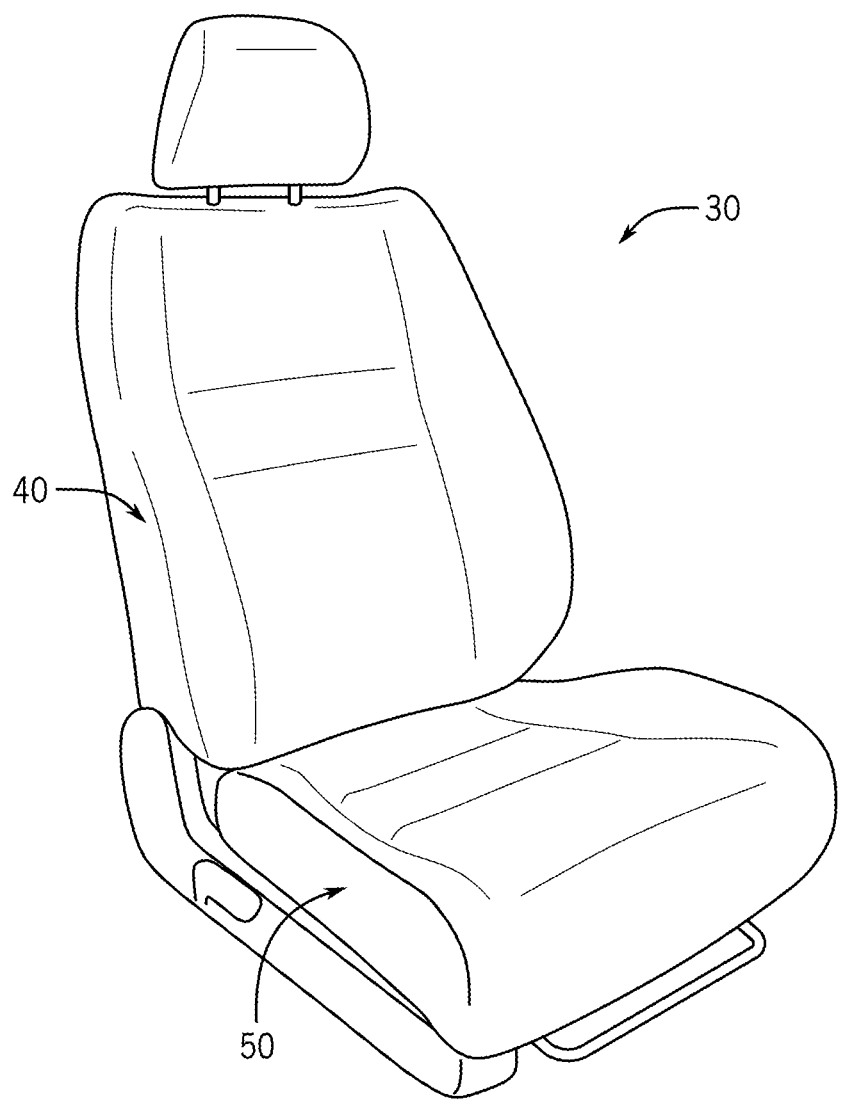
FIG. 5 is a perspective view of an embodiment of a vehicle seat that can be disposed in the vehicle of FIG. 4.
Figure 6:
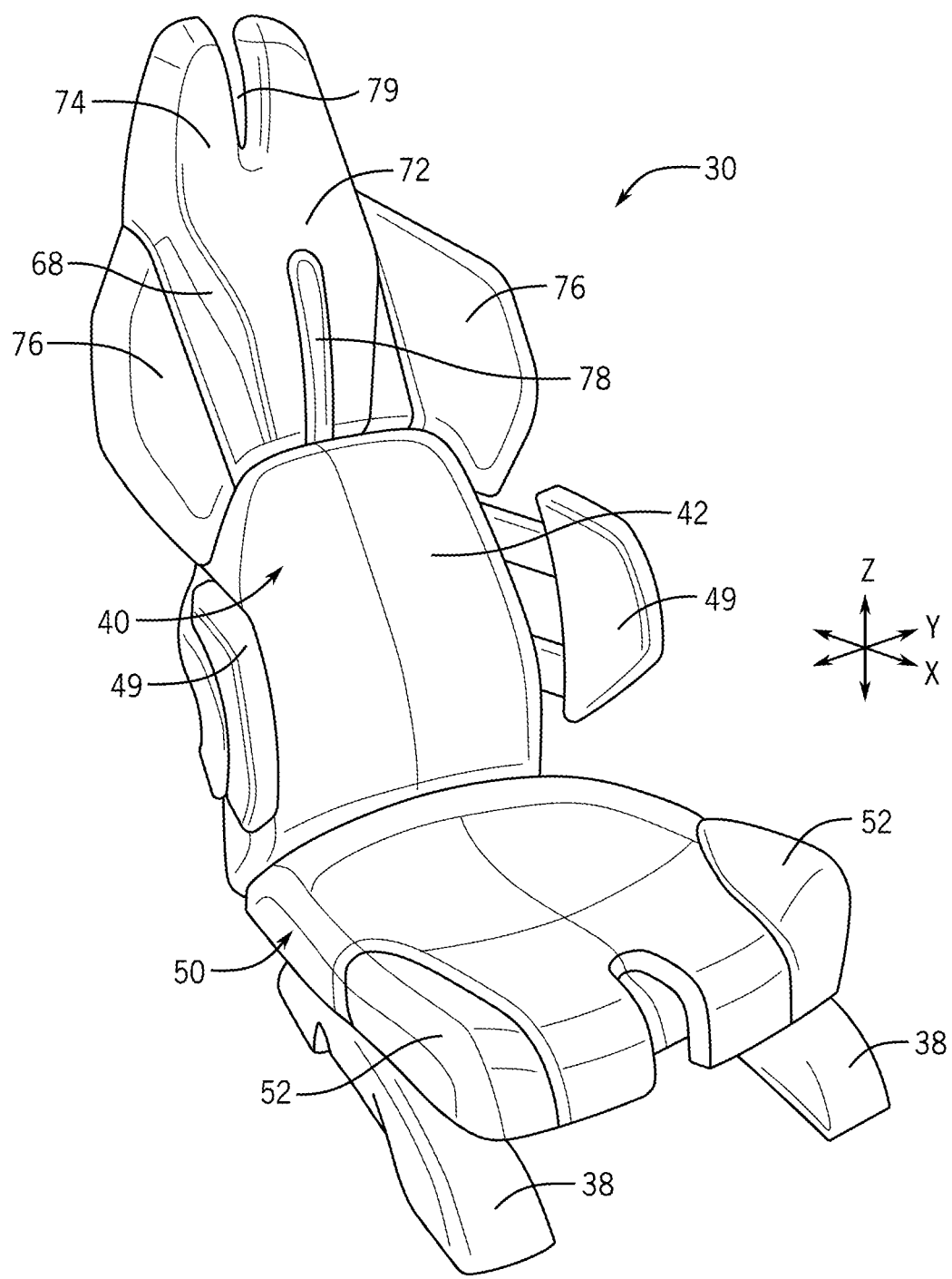
FIG. 6 is a perspective view of an embodiment of a vehicle seat that can be disposed in the vehicle of FIG. 4.

According to various embodiments as depicted in FIGS. 5 and 6, an adjustable seat 30 may be used within the vehicle 20 and may be designed in a variety of configurations according to the desired style. The adjustable seat 30 may be designed as a more traditional seat design, as shown in FIG. 5, or as an alternative design, as shown in FIG. 6. The adjustable seat 30 may be configured to support an occupant in a variety of different locations, including within the vehicle 20.

As described previously, the muscles, tendons, and bones of the human body are correlated and have a large degree of impact on each other, especially between the thighs (femurs 130), pelvis 120, and spine 110. Changing the angle and positioning between the thighs and torso changes the lordodic curve of the lumbar vertebrae 116 and the strain on the lumbar vertebrae 116, muscles, and tendons. In order to accommodate for the high degree of connectivity within the body, the adjustable seat 30 also links and correlates various portions of the seat 30 together to mimic the kinematics of the body. The adjustable seat 30 may be adjusted to fit to the contours of the back and/or support the back according to the current posture. As portions of the adjustable seat 30 are changed, other portions of the adjustable seat 30 will change accordingly and may be dependent both on the relative positions of other portions of the adjustable seat 30, as well as the body type and posture of the occupant. Accordingly, the adjustable seat 30 may incorporate one or multiple inner adjustable features (described later), according to the desired use, complexity, cost, and weight. The inner adjustable features and component may allow the relative dimensions and contours of the adjustable seat to be changed according to the desired configuration, the occupant's preferences, the occupant's body type, and the current posture of the occupant.

The adjustable seat 30 may accommodate the movement and load distribution of the occupant according to any posture of the occupant. For example, the adjustable seat 30 adjusts to a variety of postures, including an upright posture (in which the spine generally follows a "S" curve) or a slouched posture (in which the spine generally follows a "C" curve). The lumbar support may be additionally fine-tuned depending on the specific preference of the occupant and/or the occupant's body type, as described further herein.

Aspects of the Adjustable Seat.

The adjustable seat 30 generally includes a seat cushion portion 50, a seat back portion 40 that includes a backrest 42, and a contour linkage 36. Though not necessarily required, the adjustable seat 30 may include a seat frame 32, a cushion rail 24, a damping system, an upper anchor 44 of the backrest 42, a top portion 72 of the seat back portion 40, and bolster regions 55 to allow other portions of the adjustable seat 30 to be adjusted. These aspects of the adjustable seat 30 will be described in greater details below.

Seat Cushion Portion, Backrest, and Contour Linkage.

According to one embodiment, the adjustable seat 30 may include a cushion portion 50 and a seat back portion 40, which may be movable and adjustable relative to each other. The seat cushion portion 50 may refer to the entire seat cushion or seat bottom or to a certain portion or area of the seat cushion. For ease of reference, the seat cushion portion 50 is referred to as the cushion 50 herein. The cushion 50 may be configured to provide support beneath the occupant (along, approximately, the horizontal plane). The positioning of the cushion 50 relative to the seat back 40 may change how and where the occupant may need to be supported. The cushion positioning may include a fore/aft positioning (e.g., along the x-axis), a vertical positioning (e.g., along the z-axis), and/or a rotational positioning (e.g., the pivot angle about the y-axis) of the cushion 50 relative to the seat back 40. To move the cushion 50, the cushion may move or pivot along a cushion frame 22 of the adjustable seat 30. The cushion frame 22 may be located within or beneath the cushion 50.

The seat back portion 40 may refer to the entire seat back or to a certain portion or area of the seat back. For ease of reference, the seat back portion 40 is referred to as the seat back 40 herein. The seat back 40 may be configured to support the back of the occupant (along, approximately, the vertical axis). The seat back 40 may include a variety of different portions, including a backrest 42 (as shown, for example, in FIGS. 6, 7, and 9) that is configured to support a lower back portion of the occupant (e.g., the backrest 42 provides lumbar support). The backrest 42 is also movable and adjustable relative to the cushion 50. The backrest 42 may include an occupant-side surface configured to face the back of the occupant. The backrest contour of the backrest 42 directly relates to and accommodates the spinal contour of the lumbar vertebrae 116. Therefore, the backrest contour may determine how, how much, and where the backrest 42 supports the back of the occupant. The backrest curvature or contour may include, for example, a contour angle of an occupant-side surface of the backrest relative to a vertical axis (e.g., the z-axis), a maximum offset of the occupant-side surface relative to a standard position of the occupant-side surface (e.g., the prominence of the lumbar support or the amount of bending along the x-axis), and/or a vertical height of a contour apex of the occupant-side surface. The backrest 42 may span the width and at least a portion of the height of the seat back 40 to provide a complete contour.

The backrest 42 may include a lower seatback dynamic surface contour or a flexible support structure 43 that defines and shapes the backrest contour, as shown, for example, in FIG. 20. The flexible support structure 43 may be a long, flexible sheet or panel of material within at least the lower portion of the seat back 40 (e.g., within the backrest 42). The flexible support structure 43 may extend along the height and width of the backrest 42. Although the flexible support structure 43 is shown within the backrest 42, it is anticipated that an equivalent flexible support structure 43 may be used within other portions of the adjustable seat 30, including but not limited to the cushion 50 or the upper portion of the seat back 40. The flexible support structure 43 may be attached to the cushion 50 (through, for example, the contour linkage 36) such that movement of the cushion 50 may alter the shape of the flexible support structure 43 to alter the backrest contour.

The flexible support structure 43 may be constructed out of variety of compliant or flexible materials, including but not limited to nylon plastic, polymers, composites, a suspension grid with a metal based structure, or more rigid materials with pivots or linkages. Specific regions of the flexible support structure 43 may have different compliances or flexibility to obtain different degrees of curvature along the width and/or length of the backrest 42. The flexible support structure 43 may additionally include a suspension material, such as an elastomeric material.

Figure 9:
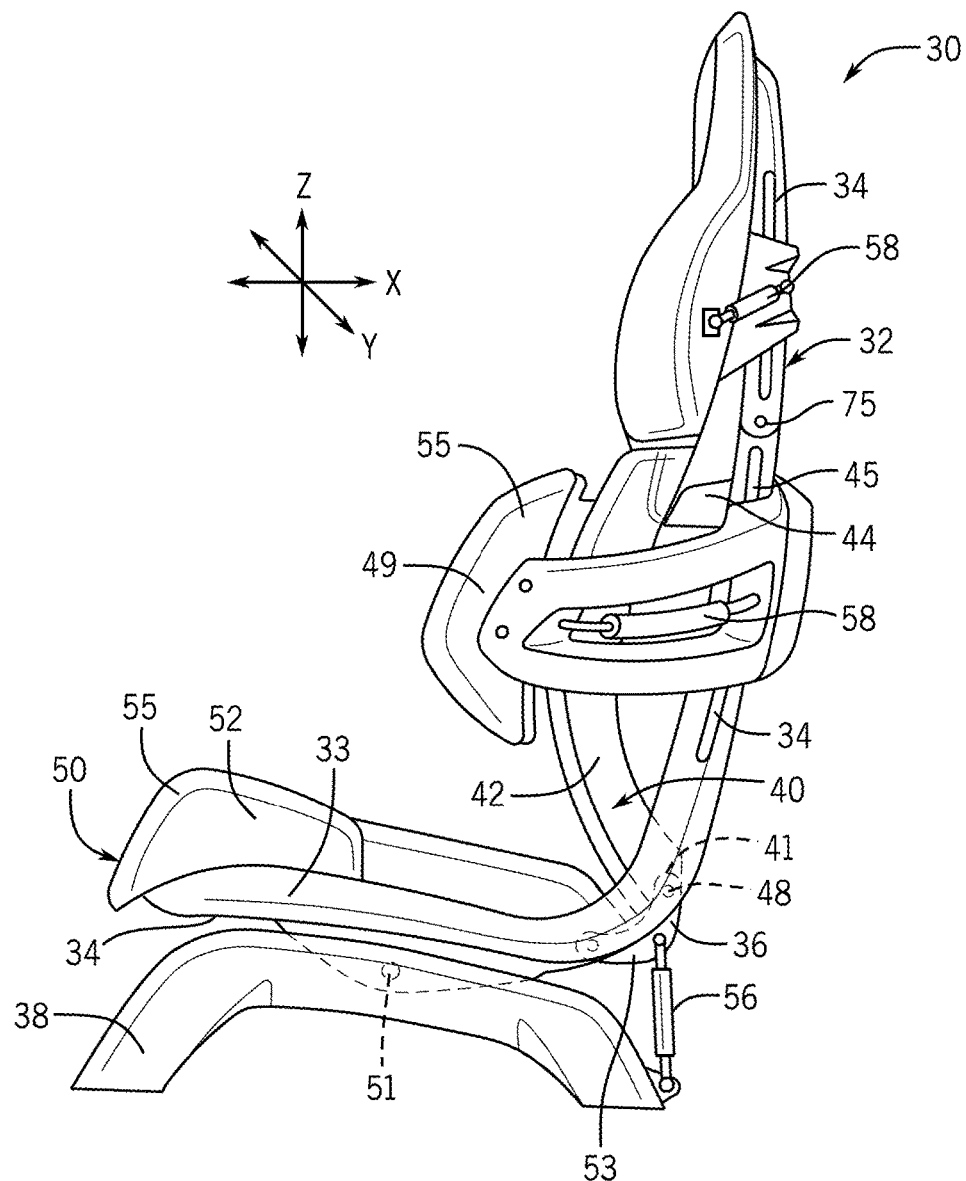
FIG. 9 is a side view of the vehicle seat of FIG. 6.
Figure 10:
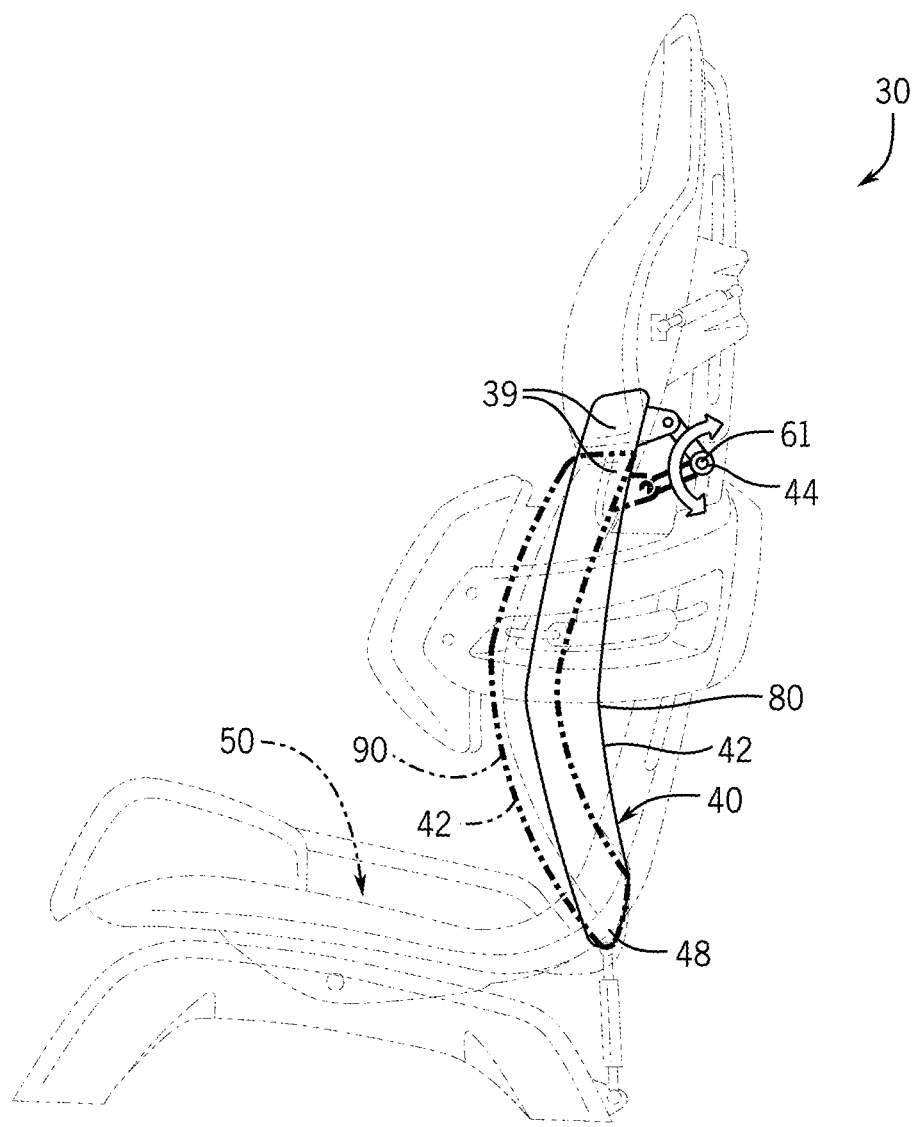
FIG. 10 is a partially see-through, side view of an embodiment of a vehicle seat that can be disposed in the vehicle of FIG. 4.
Figure 11:
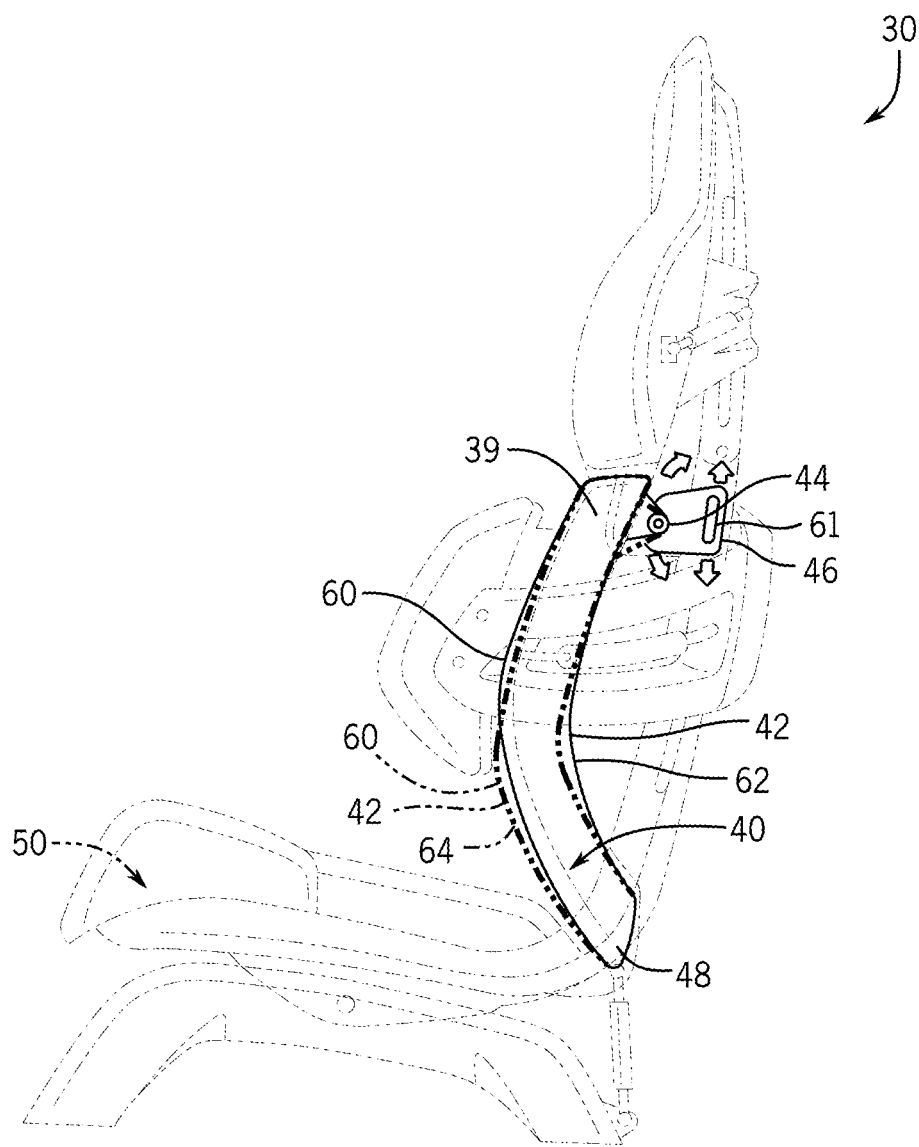
FIG. 11 is a partially see-through, side view of an embodiment of a vehicle seat that can be disposed in the vehicle of FIG. 4.

As shown in FIGS. 9-11, the backrest 42 may include an upper anchor 44 (as described further herein) and a lower anchor 48 to anchor the top end and the bottom end of the backrest 42, respectively. The lower anchor 48 may be located at the bottom of the backrest 42 within, near, or behind the bite line. According to one embodiment, the lower anchor 48 may be a pivotable attachment point along the flexible support structure 43 for the contour linkage 36 to attach to the backrest 42.

The cushion 50 and backrest 42 may be mechanically coupled or linked to each other through a pivoting or contour linkage 36 to allow the backrest contour to depend on, respond to, correspond with, be altered by, and be adjusted according to the movement of the cushion 50. As shown in FIG. 9, the contour linkage 36 allows for the backrest contour to be linked or correlated with to the movement of the cushion 50 and thus allows the seat structure to follow and support the lumbopelvic and thigh alignment throughout the occupant's seated movement. Pivotally linking the backrest 42 to the cushion 50 (through, for example, the contour linkage 36) increases the degrees of freedom of the cushion 50 relative to the backrest 42 and allows the backrest 42 to freely move with the cushion 50.

As shown in FIG. 9, the contour linkage 36 may be positioned in a rearward area (e.g., near the bite line) of the adjustable seat 30. The contour linkage 36 may pivotally attach or link to both the bottom portion or bottom region 41 of the backrest 42 (e.g., at the lower anchor 48) on one end of the contour linkage 36 and a rear portion of the cushion 50 on the other end to allow movement between the backrest 42 and the cushion 50. The pivotable attachment of the contour linkage 36 to the lower anchor 48 of the backrest 42 allows the cushion 50 to be adjusted without putting undue strain on the lower anchor 48.

Figure 17:
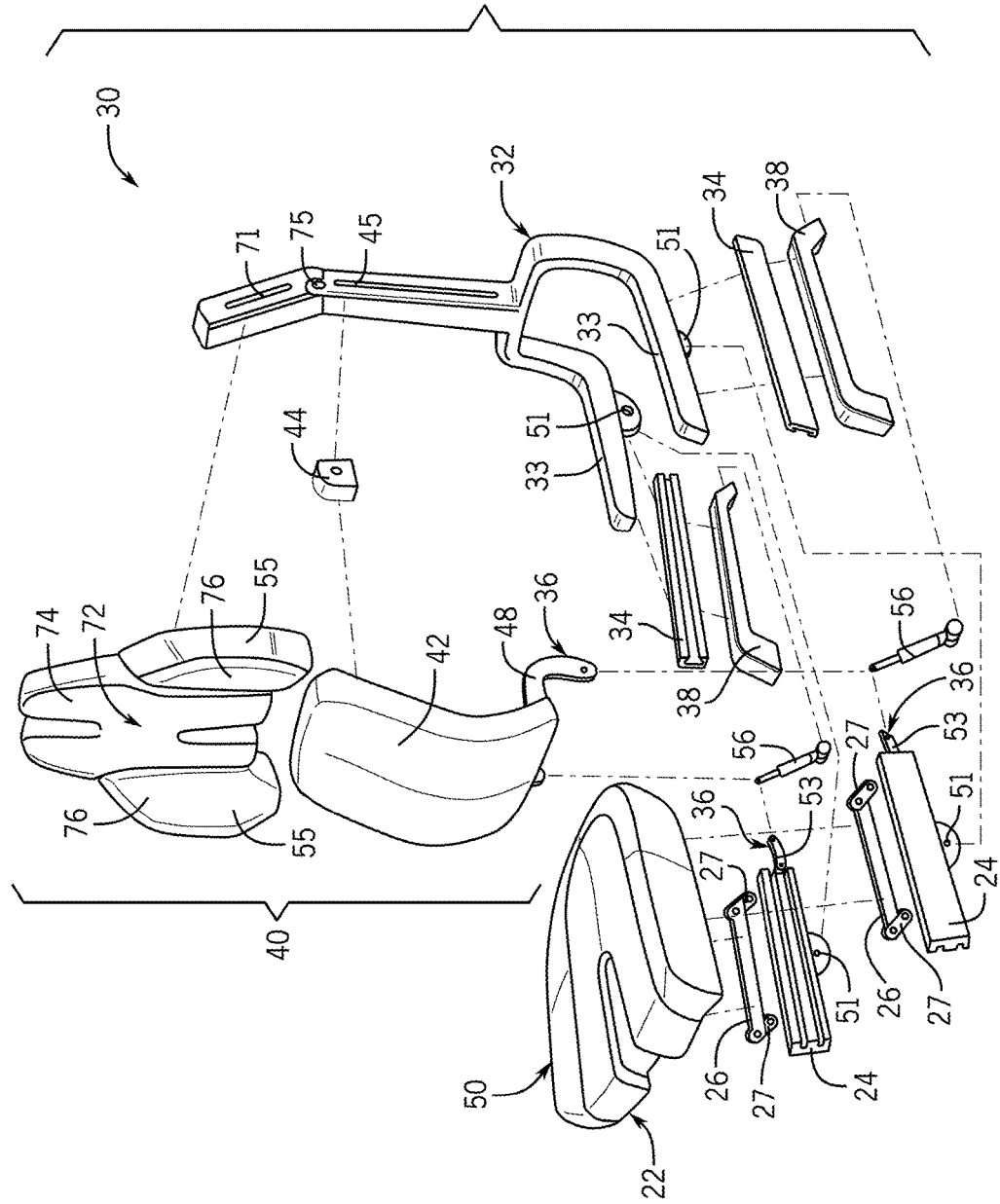
FIG. 17 is a perspective, exploded view of a portion of an embodiment of a vehicle seat that can be disposed in the vehicle of FIG. 4.

The contour linkage 36 may be one piece or structure or may include multiple components that are pivotally linked. For example, the contour linkage 36 may include a pivotable link to the lower anchor 48 of the backrest 42 and/or may include a cushion rail pivot 53, which may be pivotally attached to the cushion rails 24 (as shown in FIG. 17). According to one embodiment, the contour linkage 36 may be a part of the backrest 42 (for example, the parts may be molded together) or the contour linkage 36 may be an add-on component.

The contour linkage 36 may further include a spring (not shown) to fine-tune the adjust of the backrest contour in relation to movement of the cushion 50. The spring may attach the contour linkage 36 to the cushion 50 (e.g., to the cushion rails 24). The compliance of the spring may be changed, which may change the stiffness of the backrest 42. For example, a rotary dial (not shown) may be used to wind or unwind the spring. As the spring is wound further, the spring compliance increases, which increases the stiffness of the backrest 42 and decreases how much the backrest contour will change as a result of movement of the cushion 50 (and vice versa).

The contour linkage 36 thus directly connects and correlates the backrest 42 to the cushion 50 to allow the backrest 42 to optimally follow the adjustments and movements of the cushion 50, mimicking the kinematics of the human body. For example, the cushion 50 may be adjusted in the fore/aft direction, the vertical direction, or the rotation direction relative to the backrest 42. As the cushion 50 moves in the fore/aft, vertical, and/or rotational direction, the contour linkage 36 (which is attached to the cushion 50) may rotate accordingly. Since the contour linkage 36 is attached to the backrest 42, the contour linkage 36 may thus impose and translate a force onto the backrest 42 upon rotation of the contour linkage 36 (in response to movement of the cushion 50 relative to the backrest 42). This imposed force may thereby alter the backrest contour depending on the movement of the cushion 50. Due to the flexibility of the flexible support structure 43 within the backrest 42, moving a bottom portion of the backrest 42 with the contour linkage 36 changes the curvature of the backrest 42.

While the cushion 50 is being moved (and imposing a force on the bottom region of the backrest 42), the upper region (e.g., the upper anchor 44) of the backrest 42 may optionally be fixed in position to allow the force imposed on the bottom region (e.g., the lower anchor 48) of the backrest 42 to alter the backrest contour. According to another embodiment, the upper region may be movable to prevent the backrest contour from changing as a result of movement of the cushion 50.

According to one aspect, the movement of the cushion 50 and the backrest 42 may mimic kinematic movements of the human body and specific bodily contours of the human body to provide proper and optimal support (e.g., back support) according to the specific body and current posture of the occupant. Accordingly, in the same way that the lower back, pelvis 120, and femurs 130 are directly correlated within the human body, the cushion 50 and the backrest 42 may be directly correlated. The backrest contour may be dependent on, directly impacted by, and linked to movement and position of the cushion 50 along the fore/aft direction, the vertical direction, and/or the rotational direction relative to the backrest 42. For example, as the pelvis 120 orientation is rotated into an upright or slouched position, the occupant's load distribution between the cushion 50 and backrest 42 is changed. Therefore, the cushion 50 may move or be moved to support the pelvis 120, and the backrest contour may change accordingly to support the back of the occupant. Depending on the current angle between the thigh and torso of the occupant (and between the cushion 50 and seat back 40), the backrest contours and spine 110 may be dynamically adjusted together, thus correlating the seat movements to the kinematic movements of the occupant. By mimicking human body kinematics with the seat contours and positions, the seat back 40 contour will match the contour of the occupant's back and the pressure from the occupant load will be more evenly distributed.

Figure 14B:
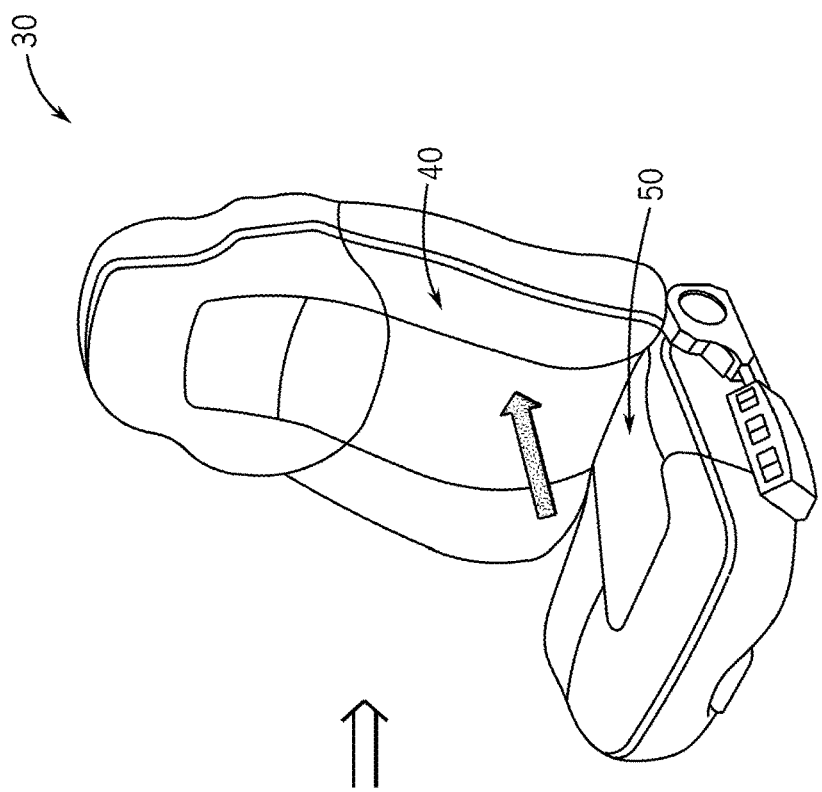
FIG. 14A-14B are perspective views of the corresponding positional changes of a cushion and a seat back of the vehicle seat of FIG. 12A.
Figure 14A:
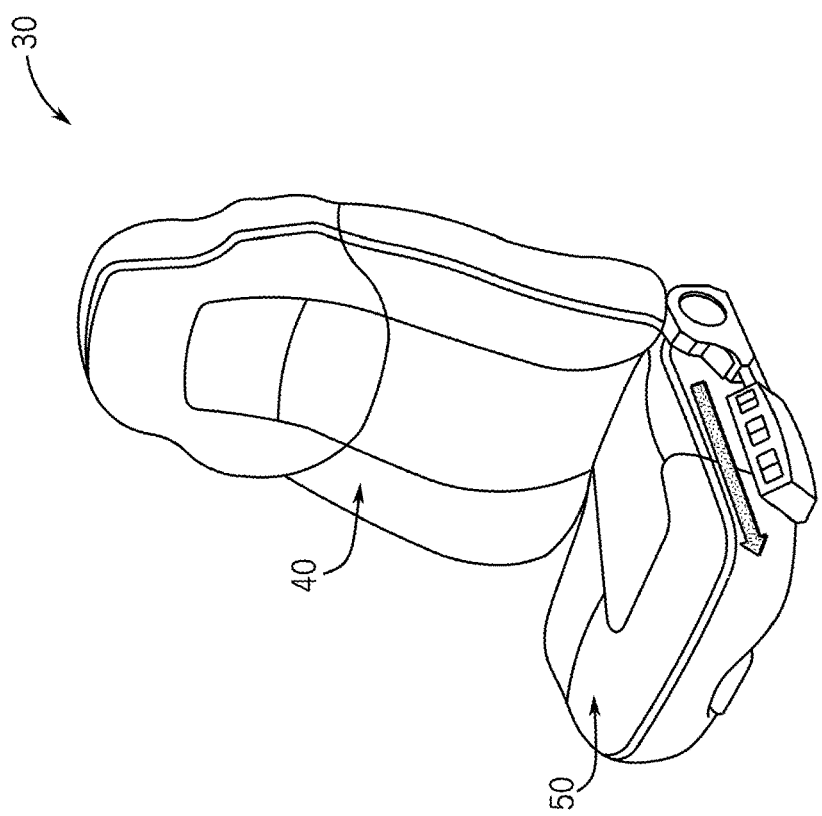

According to one embodiment, the cushion 50 may be moved forward and backward in the fore/aft direction (e.g., the horizontal direction or along the x-axis) according to the occupant's preference. Due to the configuration of the adjustable seat 30, the backrest contours may respond and adjust accordingly to provide the proper support. For example, as the cushion 50 moves forward (as shown in FIGS. 14A-B), the angle between the thighs and torso increases and the pelvis rotates the torso into a more slouched posture. Thus, the iliac crest 124 of the pelvis 120 rotates in a posterior direction (as show in FIG. 2B) and the lordodic curve of the lumbar vertebrae 116 of the spine 110 is reduced (and may even assume a kyphotic curve), shifting the occupant load from the ischial tuberosity 122 to the back of the occupant. Due to the shift in load and change in curvature, the required support for the occupant also changes. Accordingly, as the cushion 50 moves forward and the occupant load is transitioned from the cushion 50 to the seat back 40, the contour linkage 36 (and the bite line) moves forward with the cushion 50 and thus "pulls" the backrest 42 downward and into the bite line of the adjustable seat 30. (Alternatively or additionally, the contour linkage 36 may rotate clockwise (with respect to FIG. 9) as the cushion 50 moves forward, resulting in the same end effects.) This motion reduces the contour angle of the backrest 42 relative to the vertical axis, reduces the maximum offset of the backrest 42, and lowers the vertical height of the contour apex of the backrest 42, thus effectively flattening the backrest 42. The seat back 40 thus mimics the flattened portion of the lumbar vertebrae 116 to provide proper support, rather than forcing a lordodic curve to a flattened back of the occupant.

Figure 15B:
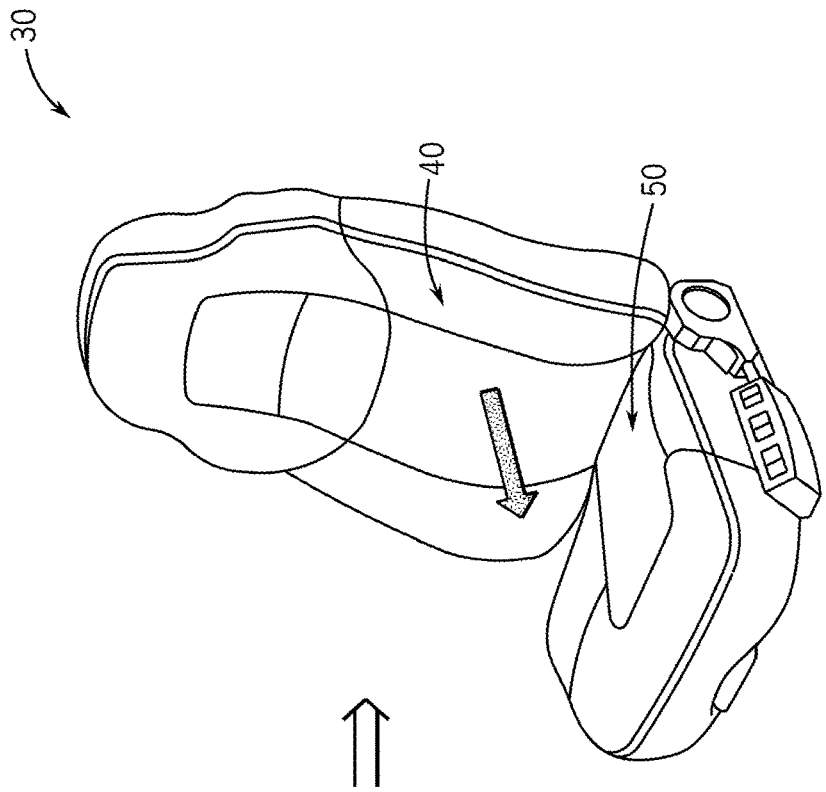
FIG. 15A-15B are perspective views of the corresponding positional changes of a cushion and a seat back of the vehicle seat of FIG. 12A.
Figure 15A:
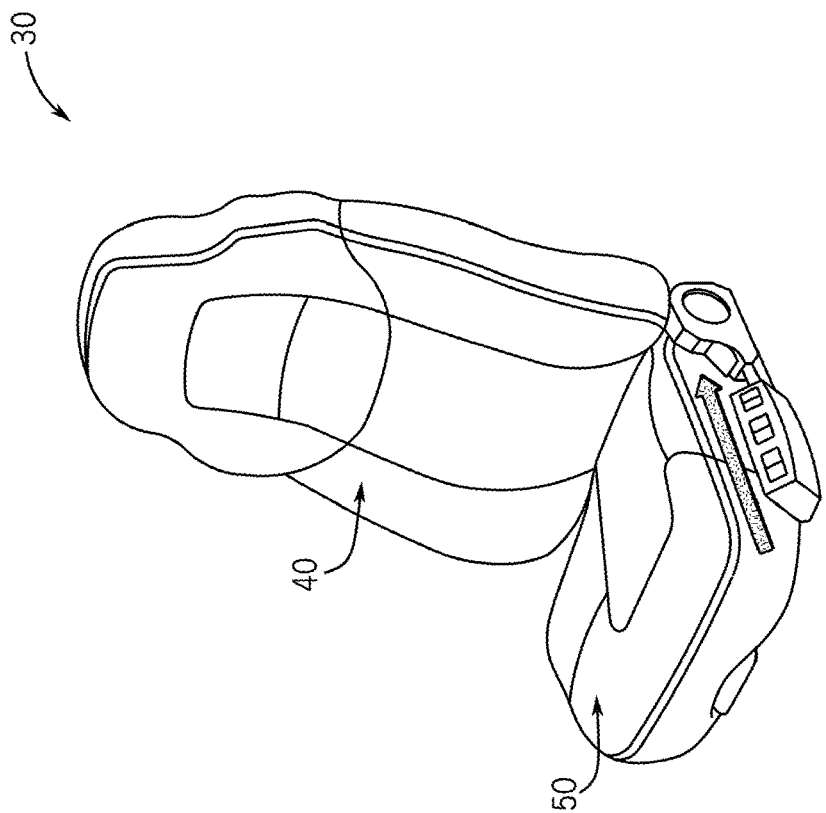

Conversely, as the cushion 50 moves backward (as shown in FIGS. 15A-B), the angle between the thighs and torso decreases and the pelvis moves toward the torso of the human body into a more upright posture. Thus, the iliac crest 124 of the pelvis 120 rotates in an anterior direction (as show in FIG. 2C) and the lordodic curve of the lumbar vertebrae 116 of the spine 110 is accentuated, shifting the occupant load from the back of the occupant to the ischial tuberosity 122. Due to the shift in load and change in curvature, the required support for the occupant also changes. Accordingly, as the cushion 50 moves backward and the occupant load is transitioned from the seat back 40 to the cushion 50, the contour linkage 36 (and the bite line) moves rearward with the cushion 50 and thus forces the bottom of portion of the backrest 42 upwards and outwards out of the bite line of the adjustable seat 30. (Alternatively or additionally, the contour linkage 36 may rotate counter-clockwise (with respect to FIG. 9) as the cushion 50 moves forward, resulting in the same end effects.) This motion increases the contour angle of the backrest 42 relative to the vertical axis, increases the maximum offset of the backrest 42, and raises the vertical height of the contour apex of the backrest 42, thus effectively increasing the contour and the lordodic curve of the backrest 42. The accentuated lordodic curve of the occupant requires more lumbar support, which is provided by the seat back 40 adjusted in relation to the cushion 50 and mimicking the lordodic curve of the lumbar vertebrae 116 in order to provide proper support.

Figure 12B:
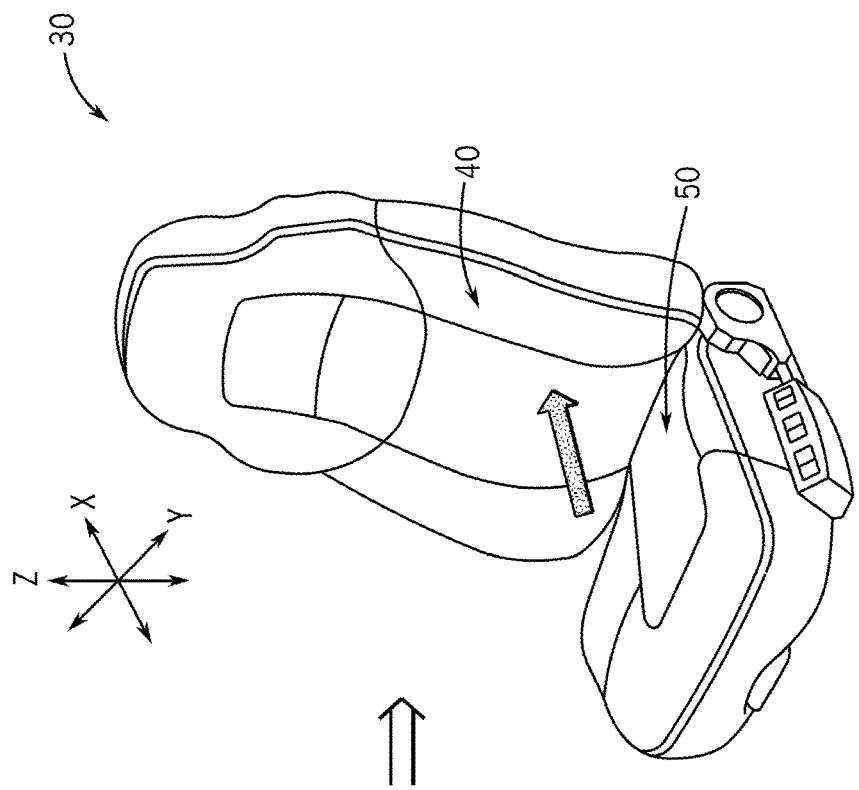
FIG. 12A-12B are perspective views of the corresponding positional changes of a cushion and a seat back of an embodiment of a vehicle seat that can be disposed in the vehicle of FIG. 4.
Figure 12A:
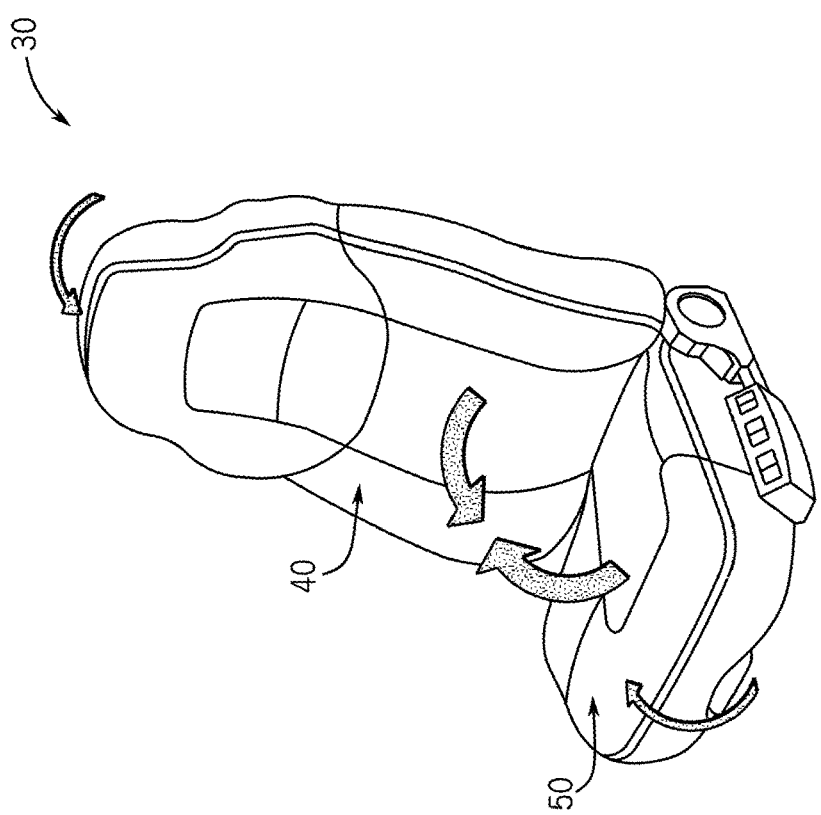

Alternatively or additionally, the cushion 50 may be adjusted along the rotational direction (e.g., about the y-axis) according to the occupant's preference. Due to the configuration of the adjustable seat 30, the backrest contours may respond and adjust accordingly to provide the proper support. The cushion 50 may, for example, pivot around pivot point 51 (as shown in FIG. 9) to tilt the cushion 50 in either direction about the y-axis. For example, as shown in FIGS. 12A-B, as the cushion 50 pivots or tilts toward the back of the vehicle (i.e. rotating the cushion front upwards and the cushion back downwards), the angle between the thighs and torso decreases and the pelvis rotates the torso into a more slouched posture. Thus, the iliac crest 124 of the pelvis 120 rotates in a posterior direction (as shown in FIGS. 2B and 3A) and the lordodic curve of the lumbar vertebrae 116 of the spine 110 is reduced (and may even assume a kyphotic curve), shifting the occupant load from the ischial tuberosity 122 to the back of the occupant. Due to the shift in load and change in curvature, the required support for the occupant also changes. Accordingly, as the cushion 50 rotates backward and the occupant load is transitioned from the cushion 50 to the seat back 40, the contour linkage 36 also rotates clockwise (with respect to FIG. 9) and thus "pulls" the backrest 42 downward and into the bite line of the adjustable seat 30. This motion reduces the contour angle of the backrest 42 relative to the vertical axis, reduces the maximum offset of the backrest 42, and lowers the vertical height of the contour apex of the backrest 42, thus effectively flattening the backrest 42. The seat back 40 thus mimics the flattened portion of the lumbar vertebrae 116 to provide proper support, rather than forcing a lordodic curve to a flattened back of the occupant.

Figure 13B:
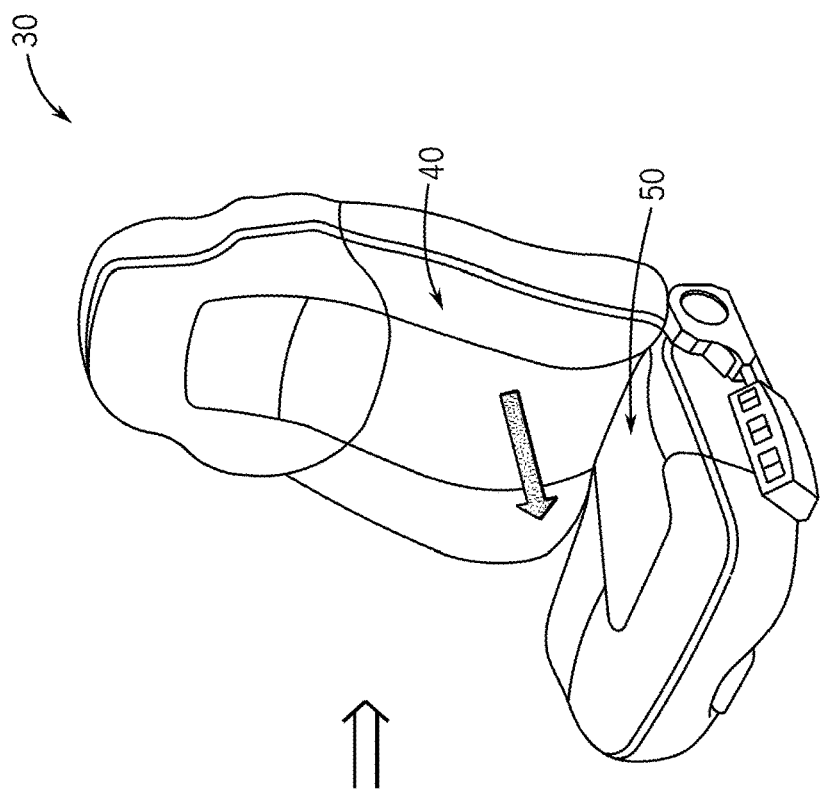
FIG. 13A-13B are perspective views of the corresponding positional changes of a cushion and a seat back of the vehicle seat of FIG. 12A.
Figure 13A:
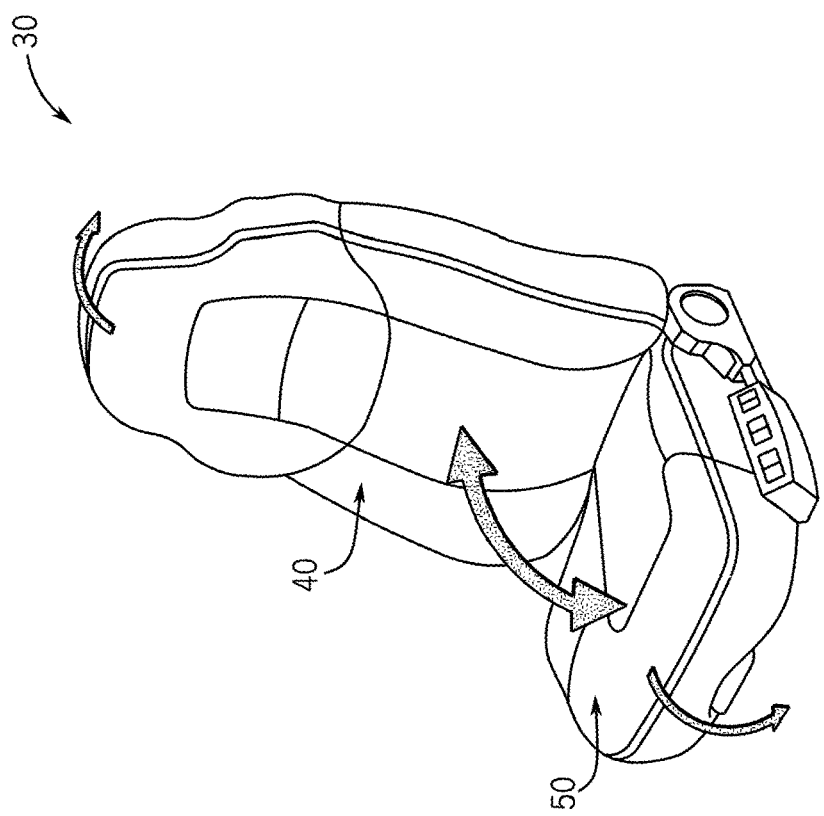

Conversely, as the cushion 50 pivots or tilts toward the front of the vehicle (i.e. rotating the cushion front downwards and the cushion back upwards, as shown in FIGS. 13A-B), the angle between the thighs and torso increases and the pelvis rotates the torso into a more upright posture. Thus, the iliac crest 124 of the pelvis 120 rotates in an anterior direction (as show in FIG. 2C) and the lordodic curve of the lumbar vertebrae 116 of the spine 110 is accentuated, shifting the occupant load from the back of the occupant to the ischial tuberosity 122. Due to the shift in load and change in curvature, the required support for the occupant also changes. Accordingly, as the cushion 50 pivots forward and the occupant load is transitioned from the seat back 40 to the cushion 50, the contour linkage 36 also rotates counter-clockwise (with respect to FIG. 9) and thus forces the bottom of portion of the backrest 42 upwards and outwards out of the bite line of the adjustable seat 30. This motion increases the contour angle of the backrest 42 relative to the vertical axis, increases the maximum offset of the backrest 42, and raises the vertical height of the contour apex of the backrest 42, thus effectively increasing the contour and the lordodic curve of the backrest 42. The accentuated lordodic curve of the occupant requires more lumbar support, which is provided by the seat back 40 adjusted in relation to the cushion 50 and mimicking the lordodic curve of the lumbar vertebrae 116 to provide proper support.

FIGS. 16A-16E show lumbar profiles of different positions the backrest 42 of the seat back 40 and the cushion 50. As shown and previously described, the cushion 50 movements affect and correspond with the back rest 42 movements. For example, FIGS. 16A-16D depict the net lumbar profiles of the adjustable seat 30 in different configurations as the cushion 50 moves in the fore/aft direction and the rotational direction and the backrest 42 is moved accordingly.

Figure 16A:
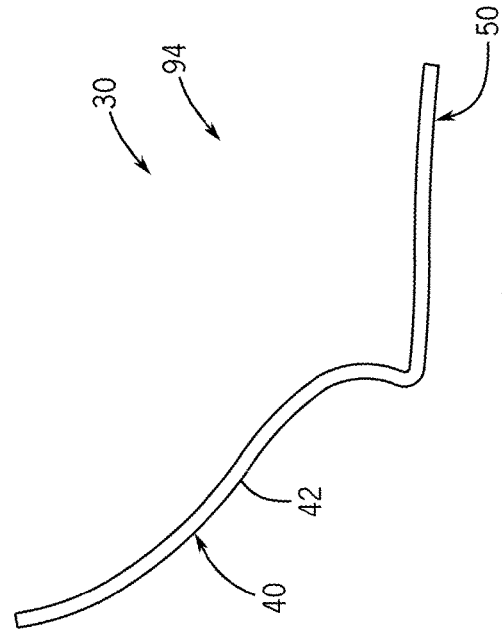
FIGS. 16A-16D are side views of lumbar profiles in different configurations that can be disposed in an embodiment of an adjustable seat.

FIG. 16A shows the cushion 50 being moved backward and the front of the cushion 50 being tilted downward (position 92). Since both of these motions increase the backrest contour (e.g., the lumbar prominence) of the backrest 42, the contours of the backrest 42 are increased as the occupant sits upright and back into the adjustable seat 30, as described previously.

Figure 16B:
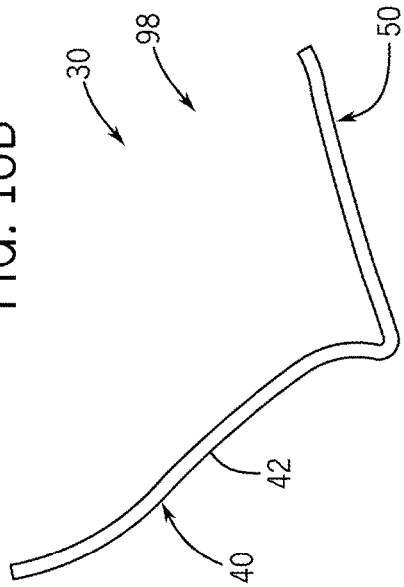

FIG. 16B shows the cushion 50 being moved forward as the front of the cushion 50 is tilted down (position 94). The backrest contour of the backrest 42 is slightly less than that of FIG. 16A since moving the cushion 50 forward decreases the backrest contour (while tilting the front of the cushion 50 downward increases the backrest contour) as the occupant slouches, as described previously.

Figure 16C:
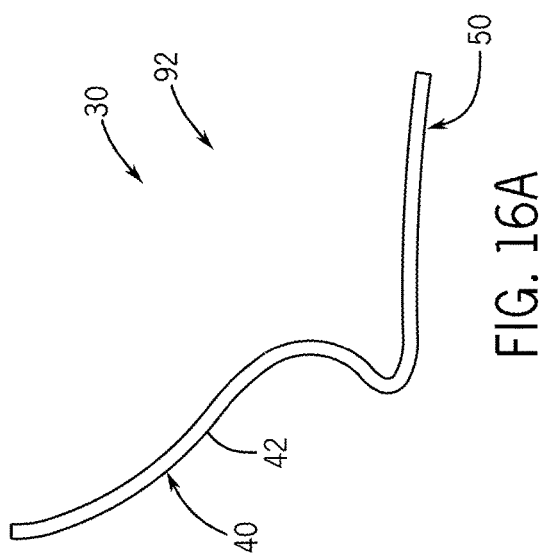

FIG. 16C shows the cushion 50 being moved backward as the front of the cushion 50 is tilted up (position 96). The backrest contour is slightly less than that of FIG. 16A since pivoting the cushion 50 upwards decreases the backrest contour (while moving the cushion 50 backward increases the backrest contour) as the occupant's thighs are raised, as described previously.

Figure 16D:
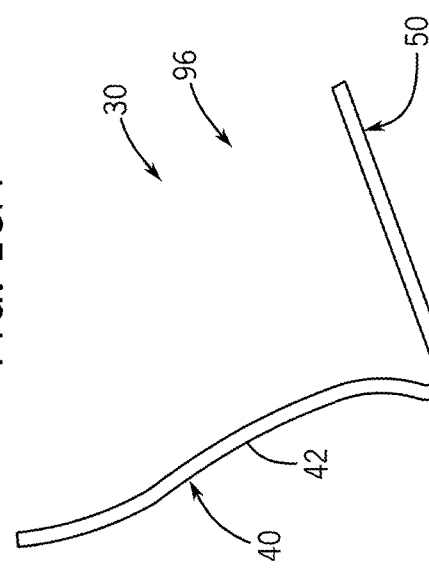

FIG. 16D shows the cushion 50 being moved forward as the front of the cushion 50 is tilted up (position 98). The backrest contour is less than that of FIGS. 16A-16C because both moving the cushion 50 forward and tilting the cushion 50 upwards reduces the backrest contour as the occupant moves forward and the occupant's thighs are raised, as described previously.

Figure 16E:
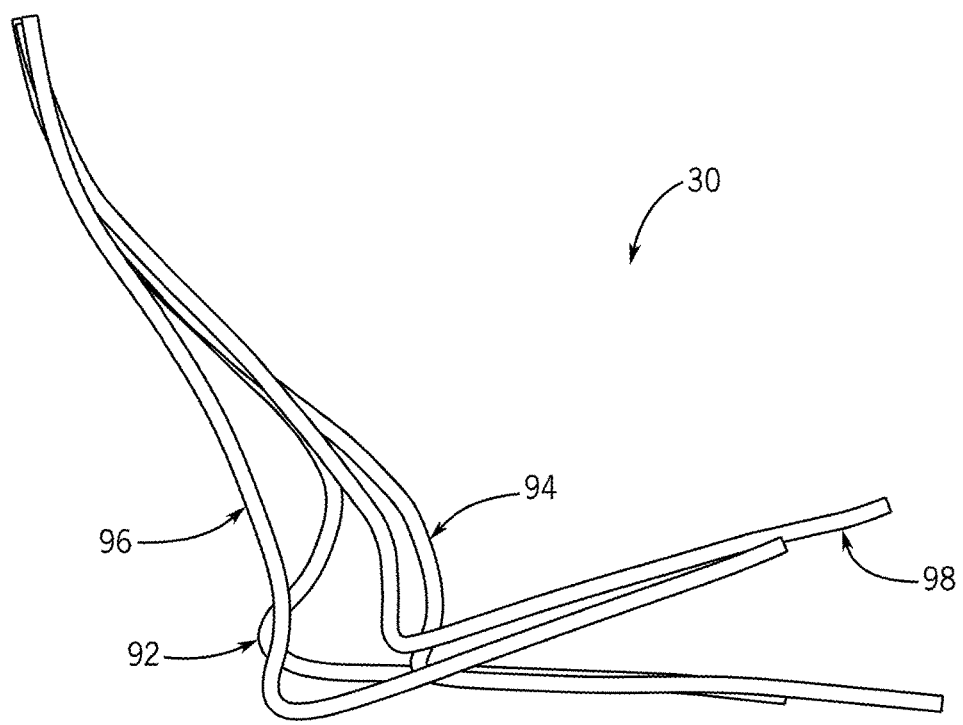
FIG. 16E is an overlaid view of the lumbar profiles of FIGS. 16A-16D.

FIG. 16E shows each of the lumbar profiles from FIGS. 16A-16D overlaid to compare the backrest contours. Position 92 has the greatest backrest contour, while position 98 has the least backrest contour within the backrest 42 of the seat back 40. Position 94 and position 96 have different relative orientations and locations of the backrest 42 relative to the cushion 50 according to the occupant preference or as determined by an algorithm correlated to the occupants body type and/or posture. As the adjustable seat 30 transitions from position 92 to position 96 (by tilting the cushion 50 upwards while maintaining the fore/aft position of the cushion 50), the load from the occupant is at least partially transferred from the cushion 50 to the seat back 40. This transition distributes the normal forces more evenly between the occupant and the adjustable seat 30.

Alternatively, according to another embodiment, the cushion 50 may only be partially adjustable with the backrest 42. For example, in order to reduce the complexity, cost, or weight of the adjustable seat 30, only movement of the cushion along one of the fore/aft direction, the vertical direction, or the rotational direction may be configured to be adjustable and to affect the backrest contour.

A variety of mechanisms, along with or within the contour linkage 36, may be used within the adjustable seat 30 to correlate, manipulate, and adjust the relative movement, positioning, and curvature of the cushion 50 and the backrest 42. For example, mechanical linkages, an electric motor, pistons, springs, cams, and/or screw drives may be used to drive the system.

The adjustable seat 30 may include a variety of other components and mechanisms to adjust other portions of the adjustable seat 30 according to the desired configuration and the occupant's body. For example, FIG. 17 depicts an exploded view of how a portion of the components within the adjustable seat 30 fit and interact together to allow the cushion 50 and the seat back 40 to be adjusted in various configurations, positions, and curvatures, both independently and dependently with the other. Additionally, the entire adjustable seat 30 may be adjusted relative to the vehicle 20.

Seat Frame.

Figure 8:
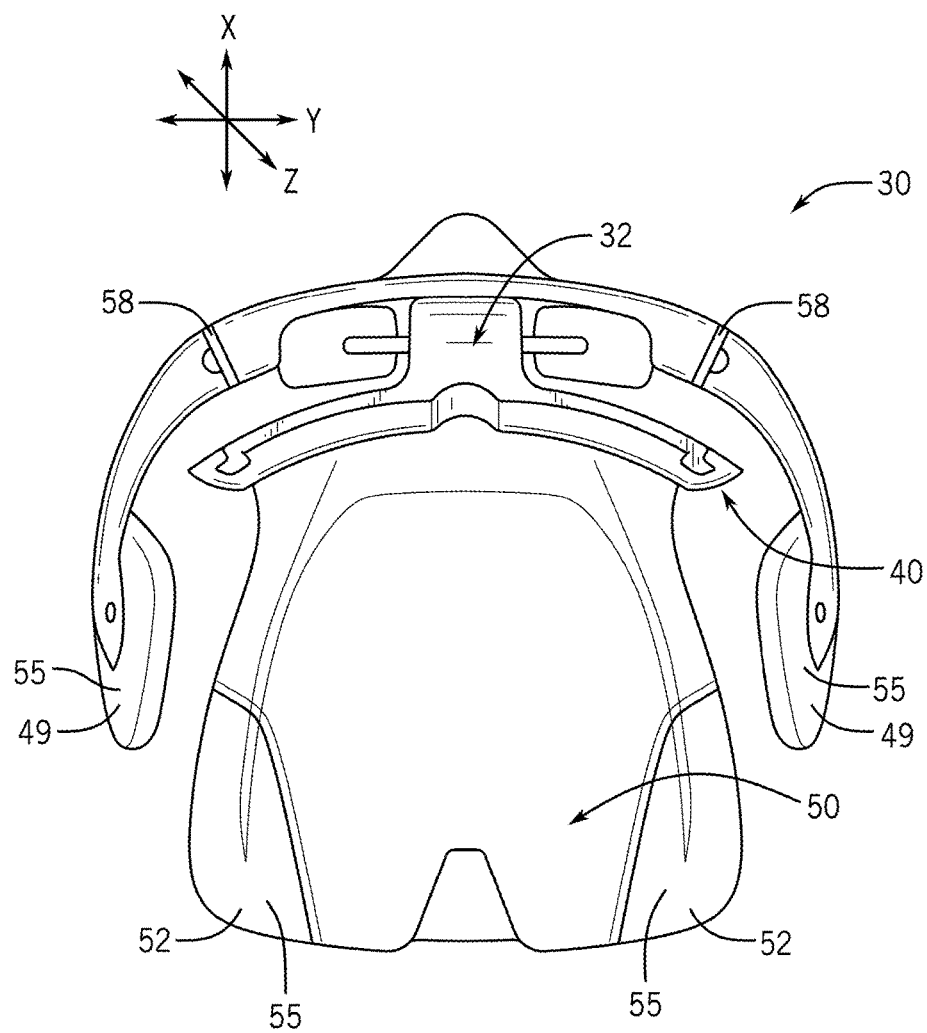
FIG. 8 is a top view of the vehicle seat of FIG. 6.

To support and increase the structural performance of the adjustable seat 30 and to provide a support structure for the various components of the adjustable seat 30 to move along or attach to, the adjustable seat 30 may include a seat frame 32. For example, the back rest 42 and the cushion may be movable relative to the seat frame 32. The seat frame 32 may be in the shape of an inverted "Y" within the adjustable seat 30 in order to support both the seat back 40 and the cushion 50. The top portion of the inverted "Y" may be centrally located within and extend along the seat back 40 (e.g., a "rear spine" of the seat back 40), as shown in FIGS. 8 and 17. The bottom portion of the inverted "Y" may extend beneath the cushion 50 and may be two diagonal or parallel portions, structures, or support rods 33 extending forward from the "spine" and spaced apart according to the desired configuration. The frame 32 may be made out of a variety of materials, including but not limited to metals, composites, a hybrid metal composite structure, or polymers.

Figure 18:
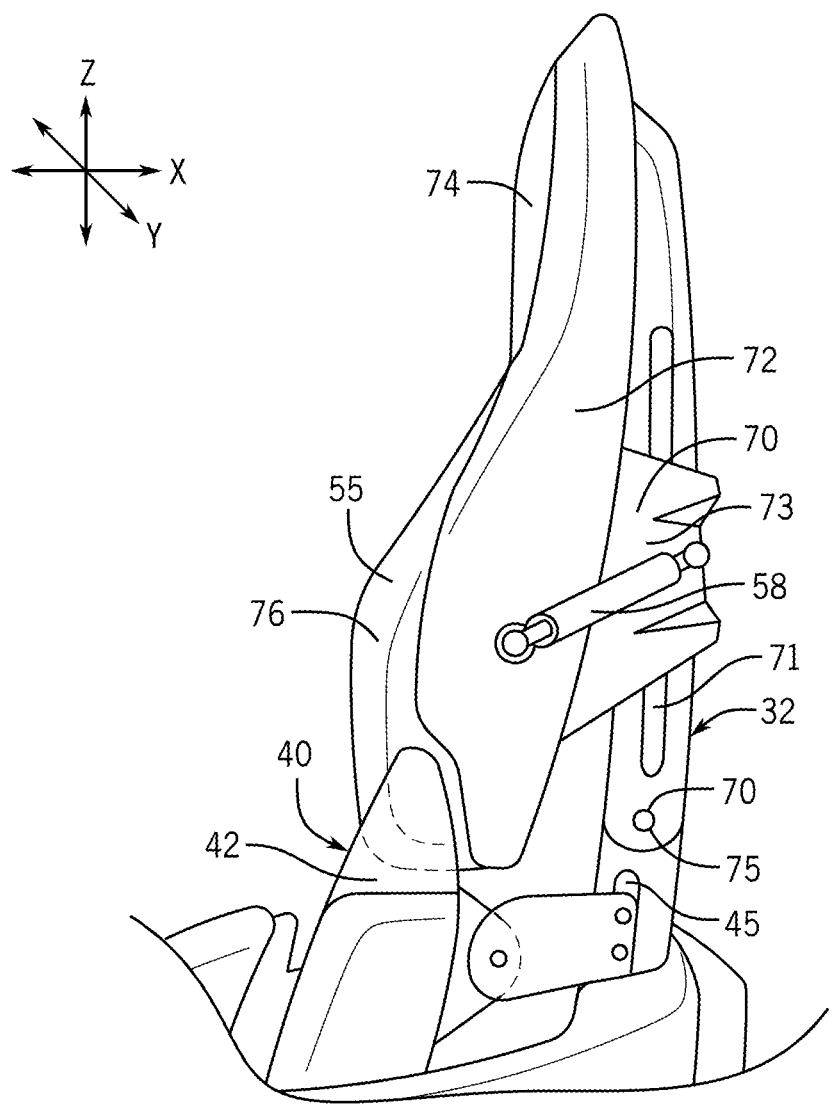
FIG. 18 is a cut-away, side view of an embodiment of a vehicle seat that can be disposed in the vehicle of FIG. 4.

The seat frame 32 may provide an anchor point and a structure to move the seat back 40 (or portions of the seat back 40, such as the backrest 42) along. For example, the seat frame 32 may provide a guide 45 (such as a channel, track, or rail) for upper anchor 44 (as shown in FIG. 18 and described further herein) and/or the lower anchor 48 of the backrest 42 to anchor to and/or move along to adjust the backrest 42.

Figure 7:
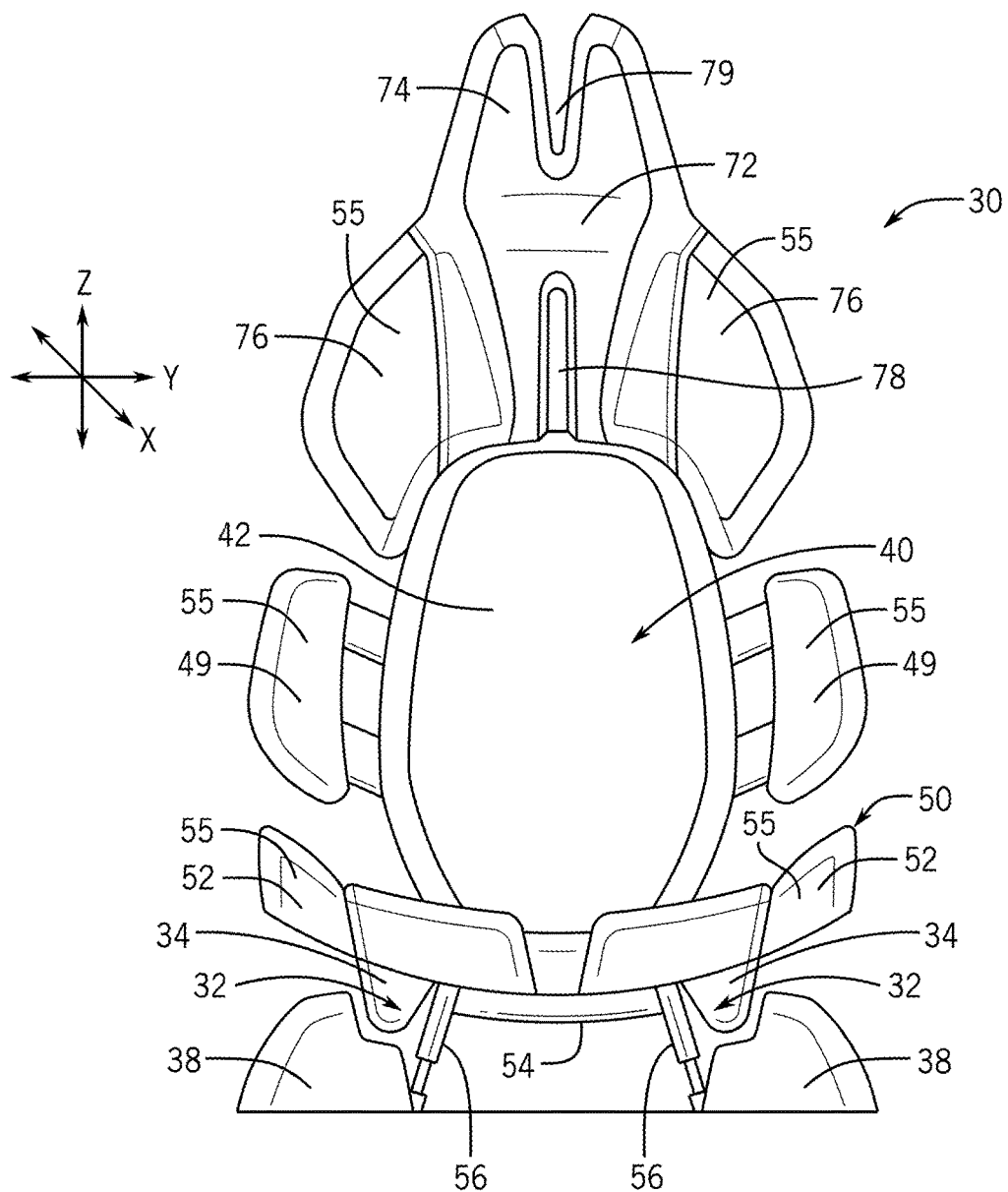
FIG. 7 is a front view of the vehicle seat of FIG. 6.

The seat frame 32 may allow the entire adjustable seat 30 to be moved relative to the vehicle 20. Accordingly, as shown in FIGS. 7, 9, and 17, the seat frame 32 may be movably attached or linked to at least one seat rail 34 to enable fore/aft adjustment of the adjustable seat 30. The seat frame 32 (and therefore the entire adjustable seat 30) to be adjusted, guided, or moved along the seat rail 34 in at least the horizontal direction (e.g., in the fore/aft direction along the x-axis). According to one embodiment, the bottom portion of the seat frame 32 (e.g., the substantially horizontal support rods 33 beneath the cushion 50) may be attached to the seat rails 34, as shown in FIGS. 7 and 17. Optionally, the seat rails 34 may extend up the seat back 40 in a vertical direction along the seat frame 32. The seat rail 34 may include tracks, rails, channels, passes, grooves, a linear motion device, pistons, belts, chains, and/or gears to provide a mechanism for linear motion of the seat frame 32.

According to one embodiment, the seat rails 34 may be horizontal, such that the seat frame 32 is only adjusted horizontally. According to another embodiment, the seat rails 34 may allow the seat frame 32 to be adjusted in the vertical direction as the seat frame 32 is moving in the horizontal direction. Accordingly, the seat rails 34 may be at least slightly angled and/or curved (with respect to the floor of the vehicle 20). For example, the seat rails 34 may be slightly angled up in the front and down in the back to account for the stature of the occupant. As the seat frame 32 is moved forward, the inclined seat rails 34 guide the seat frame 32 to also move slightly upwards to accommodate and lift up shorter occupants and position the occupant closer to the steering wheel. This mechanism may correlate the fore/aft and vertical movements in order to reduce the mass, cost, and complexity of the adjustable seat 30.

In order to support the adjustable seat 30 and connect the adjustable seat 30 to the floor of the vehicle, the seat rails 34 may be attached to or positioned on risers 38, as shown in FIGS. 6, 7, 9, and 17. The risers 38 may be located on either side of the adjustable seat 30 to correspond with the two seat rails 34, although other configurations (such as one large riser) are anticipated.

According to one embodiment, the risers 38 may be movably attached to the vehicle floor to allow the entire adjustable seat 30 to be vertically adjusted with respect to the vehicle 20. Lift mechanisms may be incorporated with the risers 38 to move the adjustable seat 30. The lifts may adjust the height of the adjustable seat 30 evenly or may only lift portions (e.g., the back or front) of the adjustable seat 30, which may allow the adjustable seat 30 to be lifted angularly. Alternatively, the risers 38 may have a stationary connection between the seat rail 32 and the vehicle 20.

Cushion Rail and Frame.

The seat frame 32 may further support the cushion 50 and allow the cushion 50 to move relative to the seat frame 32.

For example, the cushion 50 may have a cushion rail 24 along a bottom portion of the cushion. The cushion rail 24 may enable the cushion 50 to be adjusted in the rotational direction, the fore/aft direction, and/or the vertical direction. As described further herein, movement of the cushion 50 may cause a change in the backrest contour. Accordingly, the contour linkage 36 may be moveably or pivotably attached to a rear portion of the cushion rail 24 to provide a connection to the backrest 42.

In order to allow the cushion 50 move, rotate, or pivot in the rotational direction (e.g., along the y-axis) with respect to the seat frame 32, the cushion rail 24 may be pivotally attached to bottom support rods 33 of the seat frame 32 through pivot point 51, as shown in FIGS. 9 and 17. The cushion 50 to be pivoted or tilted in either direction with respect to the seat frame 32 about the pivot point 51. The cushion rails 24 may be located on and attached to the inside or the outside of the support rods 33 of the seat frame 32.

In order to allow the cushion 50 to move along the fore/aft direction (e.g., along the x-axis) with respect to the seat frame 32, the cushion rail 24 may include a slide mechanism 26 attached to a bottom portion of the cushion 50, as shown in FIG. 17. The slide mechanism 26 may be configured to slide along inside or outside of the cushion rail 24 to adjust the fore/aft position of the seat cushion 50.

In order to allow the cushion 50 to move in the vertical direction (e.g., along the z-axis) with respect to the seat frame 32, the cushion rail 24 may include a lift mechanism. According to one embodiment, each slide mechanism 26 may include lift links 27 on either side (e.g., the front and back), as shown in FIG. 17, to raise and lower the cushion 50 with respect to the seat frame 32 and the backrest 42. The lift links 27 may be at least partially within the cushion 50. The lift links 27 may be movably attached to either side of the horizontal arm member of the slide mechanism 26. In order to further rotate the cushion 50, the front and back lift links 27 may be independently adjusted. However, it is anticipated that other lift mechanisms may be utilized.

A cushion frame 22 may be attached or linked to the slide mechanism 26 or the lift links 27 and may include the cushion 50, foam, trim, and/or an elastomeric suspension. The cushion frame 22 may provide support for the cushion 50.

Damping Systems.

The adjustable seat 30 may include a damping system to dissipate any shock and to provide a suspension throughout the adjustable seat 30 such as, for example, a suspension system 54 and/or a shock-absorbing linkage 56 (as described further herein). However, in order to reduce the cost, weight, and/or complexity of the adjustable seat 30, the adjustable seat 30 may not have a damping system or may include various other damping component including, but not limited to, more foam, certain geometric designs (including springs, such as leaf spring or coil springs), or other load or shock dissipating materials to reduce the amount of jounce. For example, the adjustable seat 30 may also include seat suspension material, such as, for example, an elastomeric material woven into a nylon or polyester material.

According to one embodiment, the adjustable seat 30 may include a suspension system 54 that may be located beneath or within the seat frame 32, the cushion 50, the cushion frame 22, and/or the cushion rails 24, as shown in FIG. 7. This suspension system 54 may be elastomeric and may alternatively or additionally be located with the seat back 40.

According to another embodiment, the adjustable seat 30 may optionally include the shock-absorbing linkage 56 to absorb or dampen the load, manage impact loads, to absorb jounce from occupant loading or vehicle movement, and to provide shock absorption. As shown in FIGS. 7 and 9, the shock-absorbing linkages 56 may be located beneath the seat frame 32 and/or beneath and/or within the cushion 50 and seat back 40. Shock-absorbing linkages 56 may be located beneath the bite line (as shown in FIG. 9) and/or beneath the cushion 50 (as shown in FIG. 7) to allow for occupant deflection damping.

The shock-absorbing linkages 56 may be attached to a variety of different components within the adjustable seat 30, include the cushion 50, the backrest 42, the top portion 72, the seat back 40, or the contour linkage 36. Since a large amount of shock or force is directed to the contour linkage 36, the shock-absorbing linkage 56 may be attached to a bottom portion of the contour linkage 36 or at the connection point between the cushion rail pivot 53 and the lower anchor 48. The shock-absorbing linkage 56 may further connect to the floor of the vehicle at the other end of the shock-absorbing linkage 56.

The shock-absorbing linkage 56 may include a variety of mechanisms, including but not limited to dampers, pistons, drivers, and actuators. The shock-absorbing linkages 56 may be spring loaded, pneumatically driven, or electromechanically activated to mitigate the spinal loading. The shock-absorbing linkages 56 may also be made of a suspension material that is able to absorb movement or jounce.

Shock-absorbing linkage 56 may be completely or partially dependent on the cushion 50 and backrest 42 movements and may be designed to not hinder their corresponding movements. According to one embodiment, the shock-absorbing linkages 56 may be free-floating until the position (relative orientations and curvatures) of the adjustable seat 30 have been set. After this point, the shock-absorbing linkages 56 may function as dampers within the adjustable seat 30 to act as a suspension and reduce the amount of jounce translated to the occupant.

In addition, the shock-absorbing linkages 56 may be useful in the event of an accident. With a rear collision, for example, the shock-absorbing linkages 56 may manipulate the position and contours of the entire adjustable seat 30 to cup the occupant further into the seat. For example, the shock-absorbing linkages 56 attached to the contour linkage 36 may move down to pull both the contour linkage 36, and, thereby the cushion 50 and seat back 40, downward to flatten out the backrest 42. This movement draws the occupant further back into the seat, decelerates the occupant, and provides additional support to the upper neck and the back of the skull.

With a front collision, the shock-absorbing linkages 56 may be used to tilt the entire adjustable seat 30 or the seat frame 32 backward within the car in order to pocket or cradle the occupant within the seat. This movement may prevent the occupant from submarining (sliding underneath the seatbelt or under the steering wheel). Alternatively or additionally, the cushion frame 22 and/or seat frame 32 may include a structure to stabilize the adjustable seat 30 and prevent submarining. The structure may be a variety of structures or mechanism, including but not limited to a cross-beam or a square, polymer, or composite structure to help distribute the load. This stabilizing structure may direct the load distribution of the occupant load to be directed into the risers 38, the seat frame 32, and/or any outside members.

Upper Anchor of the Backrest.

According to one embodiment, the adjustable seat 30 may allow the backrest contour to be adjusted independently and discreetly from movement of the cushion 50. For example, an upper anchor 44 may attach an upper region 39 of the flexible support structure 43 of the backrest 42 to the seat frame 32 in a variety of different ways. The upper region 39 may be attached to the seat frame 32 at an attachment point 61. The upper anchor 44 (and the location of the attachment point 61) may be fixed, partially adjustable (e.g., rotatable, as shown in FIG. 10), or completely adjustable (e.g., rotable and slidable as shown in FIG. 11) relative to the seat frame 32. Adjusting the upper anchor 44 relative to the lower anchor 48 (e.g., altering the location of attachment between the upper region 39 of the flexible support structure 43 and the seat frame 32) alters the backrest contour independently of any movement of the cushion 50. For example, the backrest 42 may be flexed or extended to change the backrest contour as the upper anchor 44 is moved. By pivoting or moving the upper anchor 44 vertically along the seat frame 32, the contours of the backrest 42 may be changed, enhanced, or reduced without requiring the cushion 50 to be adjusted.

As shown in FIGS. 10 and 11, to flatten the backrest 42 to a relatively flattened backrest 80, the upper anchor 44 may be rotated and/or pulled up along the seat frame 32, thereby changing the backrest profile and reducing the contour of the backrest 42. Alternatively, the backrest 42 contour may be accentuated to a relatively contoured backrest 90 with a lordodic shape by rotating and/or pulling the upper anchor 44 down along the seat frame 32.

According to one embodiment as shown in FIG. 10, the upper anchor 44 may pivot up and down to move the location of the attachment point 61, but may be fixed along the length of the seat frame 32. According to another embodiment as shown in FIG. 11, the upper anchor 44 may additionally move or slide within or along the guide 45 within the seat frame 32 as well as pivot up and down to change the contour of the backrest 42. For example, the upper anchor 44 may include and may be located on an upper anchor track slide 46 that may move at least partially along the length of the seat back 40. Both the pivoting mechanism and the sliding mechanism may allow the contours of the backrest 42 to change. By having both the upper anchor 44 and the upper anchor track slide 46, both the degree of curvature and the position of the apex 60 may be manipulated.

It may be desirable to change the vertical height of the contour apex 60 (the height of the peak of the contour along the length of the backrest 42) to align the apex 60 with the occupant's spinal curvature apex according to the stature, posture, and/or support preference of the occupant. The position of the apex 60 of the contour may be moved up and down through a variety of mechanisms. For example, the upper anchor 44 and/or upper anchor track slide 46 may be used to adjust the apex 60 position. FIG. 11 shows the backrest 42 with a high apex 62, as the upper portion of the backrest 42 moved, twisted, or pivoted upwards and with a low apex 64, as the upper portion of the backrest 42 is moved, twisted, or pivoted downwards. The apex 60 position of the backrest 42 may be manipulated passively as the upper anchor 44 and/or upper anchor track slide 46 move. Alternatively or additionally, the apex 60 position may be manipulated actively with a mechanism such as a motor or piston to push along certain regions of the backrest 42 to move the curve up or down along the seat back 40. According to one embodiment, a screw-driven mechanism with a spring loaded attachment may be used to both adjust the apex 60 position and to account for dynamic jouncing or impact shocks.

A locking mechanism (not shown) may optionally be integrated with the upper portion of the backrest 42 (e.g., with the upper anchor 44, the upper anchor track slide 46, the lower anchor 48) to maintain the positioning and contours of the backrest 42. For example, the locking mechanism may lock the upper anchor 44 while the cushion 50 is being moved such that the movement of the cushion 50 is transferred to the backrest 42 to change the backrest contour. To minimize the change in backrest contour, the upper anchor 44 may be unlocked. Further, as the upper anchor 44 is being moved along the seat frame 42, the lower anchor 48 and/or the contour linkage 36 may be locked to prevent the backrest movement from transferring to the cushion 50. Both the upper anchor 44 and the upper anchor track slide 46 may be designed according to the desired degree of movability and flexibility (e.g., the size and degree of movability or rotation).

Adjusting the contour of the seat back 40 without changing the position of the cushion 50 may be particularly useful for fine-tuning adjustments to create a more customized curvature to the occupant's spine 110. These fine-tuning adjustments may be controlled manually by the occupant and/or with an algorithm (as described further herein). For example, moving the cushion 50 forward generally decreases the degree of curvature within the seat back 40, as discussed previously. However, the occupant may want the cushion 50 moved forward as well as a high degree of curvature within the seat back 40. Accordingly, the occupant may maintain the cushion 50 position while increasing the curvature of the seat back 40 by decreasing the height of the upper anchor 44. The same concept may be applied to other adjustments within the adjustable seat 30.

Alternatively or additionally, the relative position of the apex 60 to the back of the occupant may also be adjusted by moving the occupant with respect to the seat back 40. For example, based on the occupant's height, the cushion 50 may be moved vertically relative to the seat back 40 with lift links 27 to properly align the seat back 40 to the contours along the occupant's back. The contours of the backrest 42 may stay the same as the cushion 50 moves along the seat back 40 to align where the contours fall along the back of the occupant. If the occupant is relatively shorter, it may be preferable to position the cushion 50 higher along the length of the backrest 42. Conversely, it may be preferable to position the cushion 50 lower along the length of the backrest 42 with relatively taller occupants. As the cushion 50 moves vertically, due to the contours of the backrest 42, the horizontal distance between the backrest 42 and the cushion 50 will change as the height of the cushion 50 changes. Additionally, the cushion 50 may be adjusted horizontally and rotationally relative to the backrest 42 with the slide mechanism 26 and cushion rail 24, as described further herein.

Top Portion of the Seat Back.

According to one embodiment, the seat back 40 may further include a top portion 72 positioned above and movable relative to flexible support structure 43 of the backrest 42. The upper seat back or top portion 72 may also be adjusted to fit, accommodate, and properly support the position and contours of the unique upper back (the region including the thoracic vertebrae 114), the shoulders, and the neck (the region including the cervical vertebrae 112) of the occupant. The top portion 72 may correspond to the center region of the upper thoracic vertebrae and may include a head restraint 74 and shoulder bolsters 76 (the shoulder bolsters 76 may also pivot independently, as described later). The top portion 72 may attach to the seat frame 32 through a variety of adjustable mechanisms, including, but not limited to a cable system, screw jacks, tracks, or a linear motion system.

The top portion 72 may be shifted lengthwise or vertically along the seat frame 32 with respect to the backrest 42 to adjust to the height or stature of the occupant or account for seated height variance. By adjusting the height of the top portion 72, the upper contours of the seat back 40 may be adjusted to fit the kyphotic shape and position of the thoracic vertebrae 114 while the lower contours of the seat back 40 (e.g., the backrest contour) may be adjusted correspond with the lordodic shape and position of the lumbar vertebrae 116 (or any variations in the curvatures, as described previously). The contours of the seat back 40 (both the top portion 72 and the backrest 42) may be adjusted with a variety of mechanisms, including but not limited to pneumatic bladder system, cables, pistons, screw jacks, and/or motors. The intersection point between the top portion 72 and the backrest 42 may be adjusted to correspond with the intersection between the upper back and lower back of the occupant.

The region where the backrest 42 and the top portion 72 may intersect may correspond with lower portion of the thoracic vertebrae 114 (approximately vertebrae T9-T12), which is relatively flat as the occupant back transitions from the kyphotic shape to the lordodic shape. Accordingly, the region of intersection between the backrest 42 and the top portion 72 is also relatively flat in comparison to the surrounding contours to mimic the human body.

The top portion 72 may move as one unit while providing support for the head (with a head restraint 74), shoulders (with shoulder bolsters 76), and the neck (with neck support 68). The top portion 72 may move along a guide or shaft 71 to increase or decrease the height of the seat back 40. As shown in FIG. 18, a top-portion connection mechanism 70, such as a telescoping mechanism 73 and a pivot 75, may allow the position and orientation (e.g., the height and/or angle) of the top portion 72 to be adjusted relative the backrest 42 along the seat frame 32.

For example, the telescoping mechanism 73 may allow the top portion 72 to shingle behind the backrest 42 as the top portion 72 is moved vertically along the shaft 71. By shingling behind (or in front of) the backrest 42, the top portion 72 may be vertically moved without impacting the contours of the seat back 40 and may form a seamless contour with the backrest 42 for optimal comfort and support for the upper back of the occupant. For example, as shown in FIG. 18, the top portion 72 may be shifted down and shingled behind the backrest 42 to accommodate shorter occupants. This correctly aligns the head restraint 74, shoulder bolsters 76, and seat back 40 contours with the back of a relatively shorter occupant. Conversely, for relatively taller occupants, the top portion 72 may be shifted up to expose the extra material behind the backrest 42 and provide sufficient seat height and proper contour positioning for the occupant.

As shown in FIGS. 9 and 18, the top portion 72 may include a pivot 75 to allow the orientation of the top portion 72 to change with the orientation and configuration of the adjustable seat 30. The top portion of the seat frame 32, which may hold the top portion 72 of the seat back 40, may pivot about the pivot 75 relative to the rest of the seat frame 32 to move the top portion 72.

According to another embodiment, the top portion 72 may use biomimicry to adjust the orientation and configuration. For example, as shown in FIG. 19, the top portion 72 may have a front side 82 and a back side 84 with different lengths. Multiple connections or straps 86 of different lengths may connect the front side 82 to the back side 84 to allow each side to manipulate the other. The straps 86 may thereby alter the contour of the front side 82 in response to altering a contour of the back side 84 (and vice versa). Therefore, as one side of the top portion 72 is pushed up or down, the orientation and shape of the opposite side will change with forces transmitted by the straps 86. This mechanism may also be used within other portions of the adjustable seat 30, such as within the backrest 42. Although one configuration is shown in FIG. 19, other configurations are anticipated using the biomimicry.

The various top-portion connection mechanisms 70 (e.g., the telescoping mechanism 73 and the pivot 75) may also allow the top portion 72 to be adjusted according to the configuration of the rest of the adjustable seat 30. This adjustment may provide optimal visibility for the occupant by maintaining the proper eye angle without requiring the occupant to strain the upper body. For example, as the seat back 40 is reclined, the upper back of the occupant (including the thoracic vertebrae 114, the cervical vertebrae 112, and the skull) may require different support to still allow the occupant to see out of the vehicle 20. As the seat back 40 is reclined, the top portion 72 may pivot forward (around pivot 75, with respect to the backrest 42) to support the upper back of the occupant. The pivot 75 may be automatically and/or manually adjusted through a variety of different mechanisms including, but not limited to, gears, linkages, electric motors, pistons (including pneumatic or hydraulic), or linear motion systems.

To further improve the ability of the top portion 72 to automatically level the upper back of the occupant with respect to the rest of the adjustable seat 30, the top portion 72 may be further augmented with the use of gyroscopic or accelerometer closed loop control feedback circuits to automatically detect the position of the adjustable seat 30 and/or vehicle 20 and respond accordingly.

As shown in FIGS. 6 and 7, the top portion 72 may additionally include a spinal relief cut-out or recess 78 in the center region of the top portion 72 to correspond with and provide optimal the region of the occupant's back between the shoulder blades.

The top portion 72 may include a head restraint to support the head of the occupant. Federal regulations require that the head restraint must stop the head from accelerating in the event of an accident. One way to improve this safety of the head restraint is to bring the head restraint closer to the head. The neck support 68 of the head restraint 74 complements the curvatures of the neck and head to allow the head to lie closer to the head restraint. For example, the neck support 68 of the top portion 72 may include a lordodic curve to complement and support the neck (and the cervical vertebrae 112). The upper portion of the head restraint 74 may have a kyphotic curve (above the lordodic curve of the head restraint 74) to cup the skull.

In order to further bring the head restraint 74 toward the skull, the head restraint 74 may additionally have an additional cut-out or recess 79, as shown in FIGS. 6 and 7. The recess 79 may accommodate rearward protrusions from the occupant's head, such as hats or certain hairstyles like ponytails that may prevent the head from fully resting against the head restraint 74.

Bolster Regions.

The adjustable seat 30 may further include adjustable bolster regions 55 along various portions of the adjustable seat 30 to provide lateral support for the occupant and to support and fit a variety of body types within the adjustable seat 30. For example, the adjustable seat 30 may include bolster regions 55, such as the shoulder bolsters 76, side bolsters 49, and cushion bolsters 52, that may allow the height and/or width of the adjustable seat 30 to be adjusted. For example, the bolster regions 55 may be adjustable to conform to the width of the occupant. The angular position of the bolster regions 55 relative to the seat cushion 50 and/or the seat back 40 may be independent of the backrest contour and the cushion position.

The shoulder bolsters 76 may be used to support the occupant along the spine (specifically vertebrae T1-T8) and the scapulae (the shoulder blades). The shoulder bolsters 76 may also be pulled back or retracted to remove or reduce the shoulder support to give the occupant more room or space if desired. The side bolsters 49 may be used to support the occupant along the spine (specifically with vertebrae T6-T12) and the thoracic cage. The cushion bolsters 52 may be used to support the occupant's lower body and to control the leg splay.

To accommodate occupants of different sizes (both height and width) and seating preferences, the bolsters may be both adjusted or adapted vertically and horizontally, independent of the seat back 40 or the cushion 50. The amount of flex or resistance provided by the bolster regions 55 for lateral support may also be adjusted. The various bolster regions 55 may use the seat frame 32 as an attachment or pivot point for the angle between the bolster region 55 and seat frame 32 to be increased or decreased in order to change the lateral support, as well as the amount of occupant space. The bolster regions 55 may additionally move vertically or horizontally along the seat frame 32 and/or seat rail 34.

As shown in FIGS. 9 and 18, the bolsters may be adjusted through a variety of mechanisms, including linkages 58. The linkages 58 may include a variety of mechanisms, including but not limited to actuators, pistons, dampers, and drivers. The linkages 58 may allow for the bolster regions 55 to laterally adjust or pivot to accommodate wider or narrower occupants. The linkages 58 may be, for example, spring loaded, pneumatically driven, or electromechanically activated to provide the proper support for the occupant at a desired and customizable location. The spring rate of amount of damping may be controlled via magnetorheological fluid or electromechanically.

The bolsters may additionally include sensors 142 (such as pressure sensors, accelerometers, or gyroscopic sensors) to create a feedback loop in order to actively change the amount of applied support or force by the bolsters according to the current orientation, amount of movement, and direction of movement of the vehicle 20. For example, the sensors 142 and circuits in the bolsters or other regions of the adjustable seat 30 or vehicle 20 may detect the degree of dynamic movements of the vehicle 20 (such as the pitch and yaw). As shown in FIG. 21, the sensed information from the sensor 142 (e.g., the orientation and movement of the vehicle 20) may be sent to a processor 144, which may cause a driver 146 to adjust the adjustable seat 30. Accordingly, the amount of compliance or support provided by the bolster regions 55 may be correlated to the amount of dynamic movement. The bolster regions 55 may utilize various circuitry or processors to adjust the compliance of the bolster regions 55 based upon dynamic movement of the vehicle 20.

While moving, the bolster regions 55 may provide more support to create a dynamic interaction between the occupant and the adjustable seat 30 in order to improve the control of the vehicle 20. For example, as a vehicle is cornering a sharp turn, the linkages 58 may increase the amount of force or support applied to allow the occupant to use the side bolster 49 to brace his or her arms, legs, and/or torso against.

Alternatively, while the vehicle is not moving or slowly moving and less lateral support is needed or desired, the bolster regions 55 may be more (or completely) compliant to allow the occupant to freely move within the adjustable seat 30. For example, the linkages 58 may allow the side bolsters 49 or shoulder bolsters 76 to move laterally or vertically to allow the occupant to move in and out of the seat easily and to remove the bolster regions 55 from the occupant's ingress and egress path.

Additionally, the bolster regions 55 may include an airbag (not shown) with cushioning to increase the safety of the adjustable seat 30.

According to one embodiment, the bolster regions 55 may be modular or decoupled, such that the adjustable seat 30 may be constructed with or without the bolster regions 55 according to the desired complexity, cost, and weight. Alternatively, the bolster regions 55 may be located on the adjustable seat 30 but may have varying degrees of adjustability (i.e. not adjustable, partially adjustable, or completely adjustable). For example, the bolster regions 55 may only be movable as the adjustable seat 30 is moved or may additionally be independently movable, as described previously.

Fine-Tuning Adjustments.

The various components of the adjustable seat 30 may be adjusted independently and discreetly in order to provide fine-tuning adjustments (e.g., to correlate or adjust the positioning and curvatures of the various seat components). These fine-tuning adjustment may be directly and manually adjusted by the occupant according to the occupant's desired configuration or automatically adjusted by the adjustable seat 30. For example, according to one embodiment, the adjustable seat 30 may include sensors 142, electronic circuitry (not shown), a processor 144 to detect and accordingly adjust the various components of the adjustable seat 30 according to characteristics (e.g., a detected stature, weight, or current posture) of the occupant. As shown in FIG. 21, the sensed information from the sensors 142 (e.g., about the occupant's characteristics) may be sent to a processor 144, which may cause a driver 146 to adjust the adjustable seat 30. Conventional systems could be used or adopted for used to detect and adjust the components.

A variety of adjustments may be independently fine-tuned according to the occupant characteristics. For example, the backrest contour, the bolster regions 55, the top portion position and orientation, and the entire seat position and orientation may be independently fine-tuned. According to one embodiment and as described further herein, the location of attachment of the upper region (e.g., the upper anchor 44) of the backrest 42 may be adjusted independently of movement of the cushion 50, thus altering the backrest contour.

The adjustable seat 30 may further include an kinematic paradigm or algorithm to automatically and accurately adjust various components of the adjustable seat 30 according to the occupant characteristics. For example, the algorithm may represent a mathematical optimization of the seating position based on a variety of factors. The algorithm may be used to detect the mechanical configuration of the seat with respect to the occupant characteristics and to adjust the configuration of the seat using other controls (electronic or mechanical) accordingly. The algorithm may optionally be fully mechanical in which the seat movements correspond mechanically with the algorithm or based on the relative geometry of the adjustable seat 30. Without the algorithm, the movement of the seat back 40 may be completely mechanically dependent on the movement of the cushion 50. The algorithm, however, fine tunes the relationship of the movement between the seat back 40 and the cushion 50 to create a more ergonomic adjustment.

According to one embodiment, the algorithm may control the relative rates of adjustment or movement between the seat back 40 and the cushion 50 in order to obtain an optimized adjustment of the adjustable seat 30 and to counteract the resulting strain from the body's natural transition between different postures. For example, the algorithm may change the rate of movement of the backrest contour as the cushion 50 moves. The movement between the cushion 50 and the backrest 42 may be automatically combined by the algorithm to create the optimal resulting backrest 42 adjustment. The algorithm may work within an "ideal window" to properly correlate the backrest 42 and cushion 50. For example, backrest 42 may move within a certain range as the cushion 50 is adjusted. However, there may be an optimal arrangement between the backrest 42 and cushion 50, which may be further correlated or dependent on the specific body of the occupant, which the algorithm may help facilitate. Accordingly, the fine-tuning adjustments may be dependent on both the multiple components within the adjustable seat 30, as well as the occupant.

The algorithm may control the rates of movement according to the specific body of the occupant. More specifically, the algorithm may correlate the relative rates of movement to the occupant's weight, stature, and/or current posture (which may be inputted or automatically detected by the adjustable seat 30). For example, if the cushion 50 is moved in a certain direction, the algorithm will automatically adjust the backrest 42 according to a specific protocol based what is generally found to be an optimal arrangement for the specific body (weight and stature) of the occupant. If the occupant is a particular height or stature, then the lumbar may have an optimal position, which the algorithm will adjust the adjustable seat 30 to. If the occupant is shorter, the algorithm may automatically change the backrest contour to allow to properly align the apex of the backrest 42 with the occupant's back.

By corresponding a particular seating configuration to certain characteristics of the current occupant, the algorithm may also account for other variables that may affect seating preferences, including the gender of the occupant or correlations between the height and weight of the occupant. The protocol may be based on experimental data and may use a table reference according to what adjustments or configurations are most beneficial to provide additional comfort and/or support with different body types. The algorithm may additionally store information regarding the occupant's seating preferences.

By controlling the relative rates of adjustment for the seat back 40 and the cushion 50, the pressure transfer of the body along the adjustable seat 30 may be controllable to obtain a consistent and continuous pressure along the body of the occupant during adjustment and to distribute the shear loads of the occupant more evenly. With the algorithm, the movement of the adjustable seat 30 and the human body may be optimized and correlated. Without the algorithm, the movement of the seat back 40 relative to the cushion 50 may be reliant on mechanical dependence rather than an optimization according to the specific body of the occupant. The algorithm may additionally control the "fine-tuning" adjustments of the seat to optimize the exact curvatures and positioning to the occupant's body.

The algorithm may additionally obtain a "zero-gravity" feel by at least partially equalizing all pressures in every position as the seat 30 is adjusted. For example, the occupant may be at least partially tipped back into the adjustable seat 30 to achieve equal pressure as the load is transitioned.

Other Features of the Adjustable Seat.

As the various components of the adjustable seat 30 are moved, the entire adjustable seat 30 structure may be moved vertically and/or horizontally with respect to the vehicle 20 in order to compensate for or counter the various adjustments (such as moving the cushion 50 vertically) and to ensure or maintain the proper positioning of the occupant relative to the vehicle 20.

According to one embodiment, sensors 142 may also be used within the adjustable seat 30 to detect the overall orientation of the adjustable seat 30 in order to provide an optimal viewing angle for the occupant. For example, the sensors 142 may detect that the vehicle 20 is moving up a very steep hill. As shown in FIG. 21, the sensed information from the sensors 142 (e.g., the overall orientation of the adjustable seat 30) may be sent to a processor 144, which may cause a driver 146 to adjust the adjustable seat 30. Accordingly, the adjustable seat 30 (or portions of the adjustable seat 30) may be tilted to allow the occupant to see out of the vehicle 20.

According to another embodiment, in order to reduce the complexity, cost, and/or weight of the adjustable seat 30, only the lower regions (the backrest 42 and the cushion 50) may be adjustable relative to one another and the other components of the adjustable seat 30, such as the top portion 72, may be fixed.

Various mechanisms may be used to connect the different components within the adjustable seat 30. For example, pins or bolts may be inserted to moveably or pivotably connect certain components, such as the cushion rail 24 to the seat frame 32 or the contour linkage 36 to the cushion rail 24 and backrest 42.

In order to move the various components of the adjustable seat 30 relative to each other (e.g., the cushion 50 and the backrest 42, the upper anchor 44 along the seat frame 32, etc.), the components may be mechanically or electrically moved. Further, a conventional structure, such as a motor (not shown), may be used or adapted to move the components relative to each other.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

The embodiments disclosed herein provide an adjustable seat to custom fit an occupant with adjustable dimensions and contours. Besides those embodiments depicted in the figures and described in the above description, other embodiments of the present invention are also contemplated. For example, any single feature of one embodiment of the present invention may be used in any other embodiment of the present invention.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. An adjustable vehicle seat configured to support an occupant in a vehicle, comprising:
    a seat cushion portion;
    a seat back portion including a backrest movable relative to the seat cushion portion;
    a contour linkage linked to the seat cushion portion and the backrest, wherein the contour linkage is configured to impose force on the backrest upon movement of the seat cushion portion relative to the backrest in at least one of a fore/aft direction, a vertical direction, and a rotational direction,
    wherein the backrest is configured such that a backrest contour is altered based on the force imposed by the contour linkage in response to movement of the seat cushion portion relative to the backrest to move the backrest contour from a non-altered position to an altered position,
    wherein the backrest contour that is altered includes at least one of a contour angle of an occupant-side surface of the backrest relative to a vertical axis, a maximum offset of the occupant-side surface when the backrest contour is in the altered position relative to a position of the occupant-side surface when the backrest contour is in the non-altered position, and vertical height of a contour apex of the occupant-side surface,
    wherein the contour linkage is positioned adjacent a bite line of the vehicle seat,
    wherein the seat cushion portion is configured to move forward in the fore/aft direction or a front portion thereof is configured to rotate upward in the rotational direction, such that the contour linkage pulls the backrest downward and into the bite line; and
    an upper anchor attached to an upper region of the backrest, wherein the upper anchor includes a track slide that is movable along a guide as the seat cushion portion moves in order to move the backrest relative to the guide to allow the backrest contour to be changed.

2. The adjustable vehicle seat of claim 1, wherein the backrest includes a flexible support structure that defines the backrest contour, wherein the contour linkage is attached to a bottom region of the flexible support structure such that movement of the seat cushion portion alters a shape of the flexible support structure to alter the backrest contour.

3. The adjustable vehicle seat of claim 2, further comprising a seat frame, wherein an upper region of the flexible support structure is attached to the seat frame through the upper anchor, wherein the upper anchor is configured to alter a location of attachment between the upper region and the seat frame to alter the backrest contour independently of movement of the seat cushion portion.

4. The adjustable seat of claim 3, further comprising a processor that, based upon characteristics of the occupant, adjusts the location of attachment to alter the backrest contour independently of movement of the seat cushion portion.

5. The adjustable vehicle seat of claim 4, wherein the characteristics include at least one of a detected stature, weight, and current posture of the occupant.

6. The adjustable vehicle seat of claim 2, wherein the seat back portion further includes a top portion positioned above and movable relative to the flexible support structure and a top-portion connection mechanism configured to adjust at least one of a height and an angle of the top portion relative to the flexible support structure.

7. The adjustable vehicle seat of claim 6, wherein the top portion has a front side and a back side, wherein at least one strap connects the front side and the back side, and the at least one strap is configured to alter a contour of the front side in response to altering a contour of the back side.

8. The adjustable seat of claim 1, further comprising a seat frame extending along the seat back portion and extending with at least two support rods beneath the seat cushion portion, wherein the backrest and the seat cushion portion are movable relative to the seat frame.

9. The adjustable vehicle seat of claim 1, further comprising a cushion rail within or beneath the seat cushion portion and configured to move the seat cushion portion relative to the backrest in at least one of the fore/aft direction, the vertical direction, and the rotational direction.

10. The adjustable seat of claim 1, further comprising a shock-absorbing linkage connecting the contour linkage to a floor of the vehicle, wherein the shock-absorbing linkage is configured to at least one of provide shock absorption within the seat and pull the contour linkage downward in the event of an accident.

11. The adjustable vehicle seat of claim 1, wherein the seat back portion further comprises adjustable bolster regions configured to provide lateral support to the occupant, wherein an angular position of the bolster regions relative to at least one of the seat cushion portion and seat back portion is independent of the backrest contour.

12. The adjustable vehicle seat of claim 11, further comprising a processor that, based upon dynamic movement of the vehicle, adjusts the compliance of the bolster regions.

13. A method of adjusting a vehicle seat configured to support an occupant in a vehicle, comprising:
 moving a seat cushion portion relative to a backrest of a seat back portion in at least one of a fore/aft direction, a vertical direction, and a rotational direction;
 imposing a force on the backrest in response to movement of the seat cushion portion; and
 altering a backrest contour of the backrest based on the force imposed on the backrest to move the backrest contour from a non-altered position to an altered position,
 wherein the backrest contour that is altered includes at least one of a contour angle of an occupant-side surface of the backrest relative to a vertical axis, a maximum offset of the occupant-side surface when the backrest contour is in the altered position relative to a standard position of the occupant-side surface when the backrest contour is in the non-altered position, and vertical height of a contour apex of the occupant-side surface,
 wherein the contour linkage is positioned adjacent a bite line of the vehicle seat,
 wherein the seat cushion portion is configured to move forward in the fore/aft direction or a front portion is configured to rotate upward in the rotational direction, such that the contour linkage pulls the backrest downward and into the bite line,
 wherein an upper anchor is attached to an upper region of the backrest, wherein the upper anchor includes a track slide that is movable along a guide as the seat cushion portion moves in order to move the backrest relative to the guide to allow the backrest contour to be changed.

14. The method of claim 13, wherein a location of an attachment point of the upper region of the backrest configured to be fixed in position and the force is imposed on a bottom region of the backrest to alter the backrest contour.

15. The method of claim 14, further comprising, based upon characteristics of the occupant, adjusting the location of the attachment point of the upper region to alter the backrest contour independently of movement of the seat cushion portion.

* * * * *